United States Patent
Patil et al.

(10) Patent No.: US 9,936,009 B2
(45) Date of Patent: Apr. 3, 2018

(54) SYSTEMS AND METHODS OF OPERATING A DEVICE OF A DATA PATH GROUP NETWORK

(71) Applicant: QUALCOMM Incorporated, San Diego, CA (US)

(72) Inventors: Abhishek Pramod Patil, San Diego, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 14/718,906

(22) Filed: May 21, 2015

(65) Prior Publication Data
US 2015/0341447 A1 Nov. 26, 2015

Related U.S. Application Data

(60) Provisional application No. 62/002,093, filed on May 22, 2014.

(51) Int. Cl.
H04L 29/08 (2006.01)
H04L 12/26 (2006.01)
H04W 4/00 (2018.01)
H04L 12/24 (2006.01)

(52) U.S. Cl.
CPC ...... *H04L 67/1044* (2013.01); *H04L 43/0811* (2013.01); *H04L 43/10* (2013.01); *H04L 67/16* (2013.01); *H04L 41/5016* (2013.01); *H04W 4/008* (2013.01)

(58) Field of Classification Search
CPC ..... H04L 67/16; H04L 43/10; H04L 67/1044; H04L 43/0811; H04W 84/18

USPC .......................................................... 370/329
See application file for complete search history.

(56) References Cited

U.S. PATENT DOCUMENTS

| 9,143,979 B1* | 9/2015 | Lambert | H04W 28/0289 |
| 2003/0026241 A1* | 2/2003 | Ono | H04L 45/04 370/349 |
| 2009/0158394 A1* | 6/2009 | Oh | G06F 21/31 726/3 |
| 2009/0252134 A1* | 10/2009 | Schlicht | H04L 1/0015 370/338 |

(Continued)

FOREIGN PATENT DOCUMENTS

WO 2014043710 A1 3/2014

OTHER PUBLICATIONS

"IEEE Standard for Information Technology—Part 11: Wireless LAN Medium Access Control (MAC) and Physical Layer (PHY) specifications; Amendment 10: Mesh Networking", IEEE Computer Society, IEEE Std 802.11s TM-2011, Sep. 10, 2011 (Sep. 10, 2011), pp. 1-372.

(Continued)

*Primary Examiner* — Sai Ming Chan
(74) *Attorney, Agent, or Firm* — Toler Law Group, PC.

(57) ABSTRACT

A particular method includes generating a first message including data for indicating availability of a service of a data path group network and including at least one of a lifetime value or a heartbeat value corresponding to the data path group network. The method also includes transmitting the first message from a first device of the data path group network.

27 Claims, 9 Drawing Sheets

(56) References Cited

U.S. PATENT DOCUMENTS

2012/0117400 A1 5/2012 Vandwalle et al.
2013/0322297 A1* 12/2013 Dominguez .......... H04W 48/16
370/255

OTHER PUBLICATIONS

International Search Report and Written Opinion—PCT/US2015/032237—ISA/EPO—Sep. 4, 2015.

* cited by examiner

Group Attribute

| Field | Size (octets) | Value | Description |
|---|---|---|---|
| Attribute ID | 1 | 221 | Using Vendor Specific attribute ID |
| Length | 1 | Variable | |
| OUI | 3 | TBD | Vendor OUI |
| Vendor Attribute Type | 1 | 1 | Group Attribute |
| Group Key | 4 | Variable | This field may be used to distinguish two data path group networks which may have the same Group ID. This may be a hash of the current group key (e.g., the group key 124 of FIG. 1). |
| Group Channel | 1 | Variable | May indicate the channel the data path group network is operating on |
| Group Control | 2 | Variable | Group transmission schedule parameter(s). |
| Group ID | Variable (0... 32 octets) | Variable | Group ID element (e.g., ID element as defined in IEEE 802.11-2012, Section 8.4.2.101) |

202 — Attribute ID
204 — Length
206 — OUI
208 — Vendor Attribute Type
210 — Group Key
212 — Group Channel
214 — Group Control
216 — Group ID

*FIG. 2*

200

Group Control Field

| | Information | Notes |
|---|---|---|
| 302 | Group Tx Repeat | Indicates if the group TX window repeats multiple times between consecutive DWs |
| 304 | DW Offset | Indicates when the group Tx window starts after DW. |
| 306 | Group Tx Offset | Indicates time offsets between consecutive group Tx windows (e.g., when the group Tx window starts). |
| 308 | Group Tx Window Size | Indicates the size of the group transmission window. |
| 310 | Paging Window Size | Indicates the size of the group paging window which occurs at the beginning of each group Tx window. |
| 312 | Group Heartbeat | The time for which the data path group network may remain alive without hearing any provider heartbeat to keep the group alive. |
| 314 | Group Lifetime | Time for which the data path group network is expected to be active. This time is set by the provider device and counts down as time progresses. A provider device may update this time if the service it provides needs more time than what is remaining. |

214

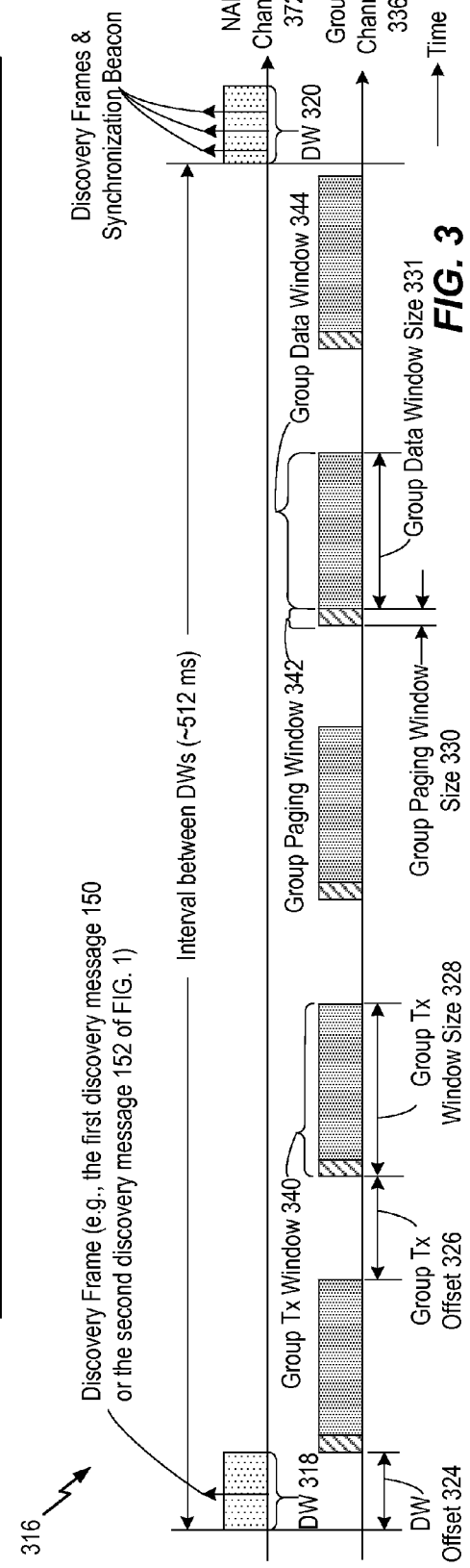

FIG. 3

SYSTEMS AND METHODS OF OPERATING A DEVICE OF A DATA PATH GROUP NETWORK

I. CLAIM OF PRIORITY

This application claims priority from U.S. Provisional Patent Application No. 62/002,093, filed May 22, 2014 and entitled "SYSTEMS AND METHODS OF DISASSOCIATING FROM A MESH NETWORK," the contents of which are incorporated herein in their entirety.

II. FIELD

The present disclosure is generally related to a data path group network.

III. DESCRIPTION OF RELATED ART

Availability of proximity-based services may enable direct wireless communication between devices that are within a communication range of each other. Utilizing proximity-based services may have high level of overhead signaling related to providing secure communications between the devices. To illustrate, devices of a data path group network may be part of a neighborhood-aware network (NAN) and may advertise, via the NAN, availability of one or more services of the data path group network, such as an audio streaming service. A device may join the data path group network to receive data that corresponds to the one or more advertised services. The device may join the data path group network by associating and directly communicating with other devices of the data path group network. Additionally, to leave the data path group network, the device may send disassociation messages to every device of the data path group network with which it has associated.

IV. SUMMARY

In a particular aspect, a method includes generating a first message including data for indicating availability of a service of a data path group network and including at least one of a lifetime value or a heartbeat value corresponding to the data path group network. The method also includes transmitting the first message from a first device of the data path group network.

In another aspect, a device includes a memory and a processor coupled to the memory. The processor is configured to generate a first message including data for indicating availability of a service of a data path group network and at least one of a lifetime value or a heartbeat value corresponding to the data path group network. The processor is further configured to initiate wireless transmission of the first message.

In another aspect, a computer-readable storage device stores instructions that, when executed by a processor, cause the processor to perform operations including generating a first message including data for indicating availability of a service of a data path group network and including at least one of a lifetime value or a heartbeat value corresponding to the data path group network. The operations also include initiating wireless transmission of the first message from a first device of the data path group network.

In another aspect, an apparatus includes means for generating a first message including data for indicating availability of a service of a data path group network and including at least one of a lifetime value or a heartbeat value corresponding to the data path group network. The apparatus also includes means for transmitting the first message from a first device of the data path group.

The present disclosure is not limited based on the aspects described in the Summary. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 2 is a diagram of an illustrative example of a group attribute field that may be included in a message;

FIG. 3 is a diagram of an illustrative example of a group control field that may be included in the group attribute field of FIG. 2;

VI. DETAILED DESCRIPTION

Figure 1:
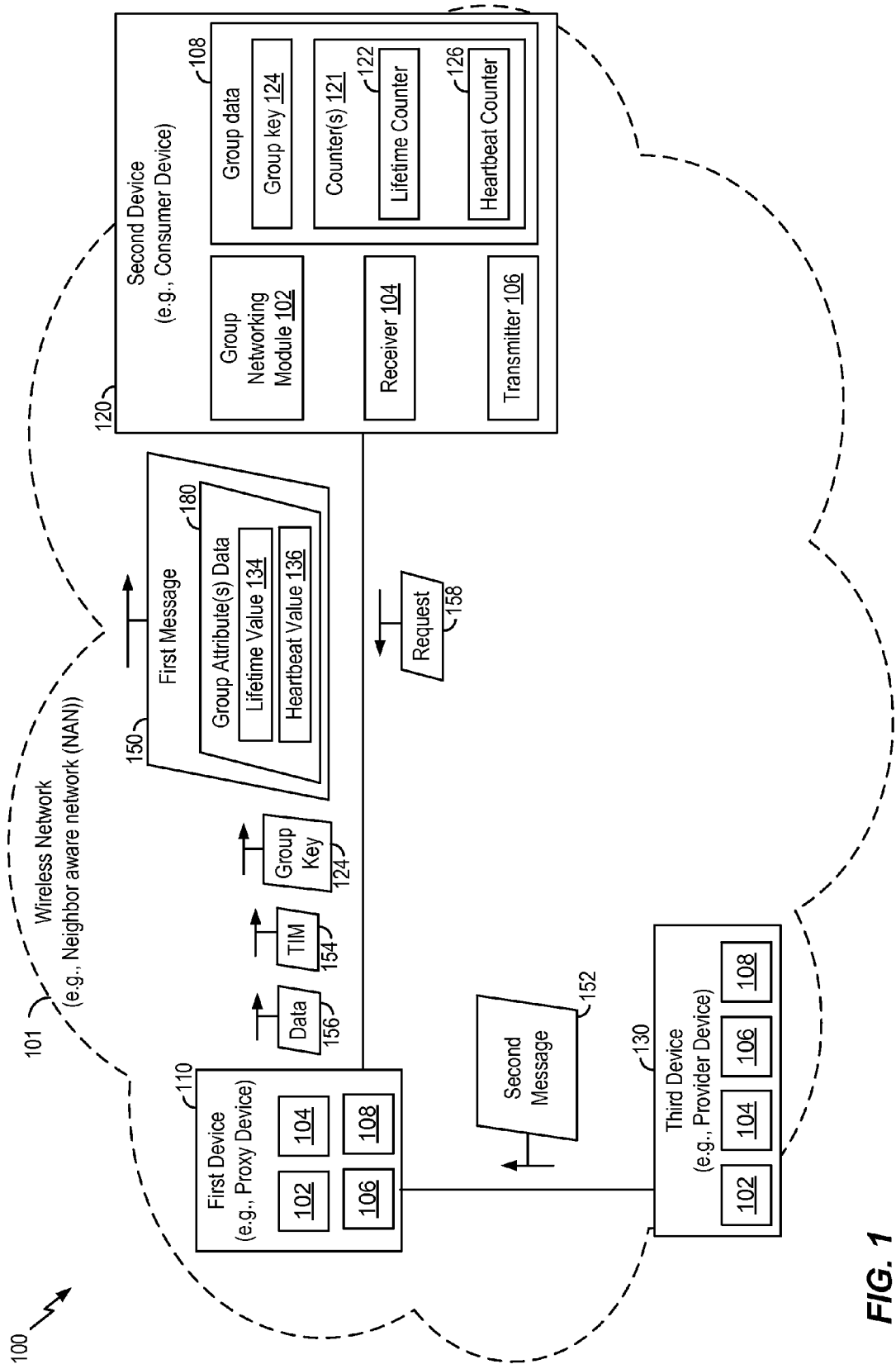
FIG. 1 is a diagram of an illustrative example of a wireless network that may utilize data path group network communication.

Particular aspects of the present disclosure are described below with reference to the drawings. In the description, common features are designated by common reference numbers.

Systems and methods of operating a device of a data path group network are disclosed.

In some implementations, a first device may generate a message advertising a service available via the data path group network. The message may include information, such as group attributes, that corresponds to the data path group network via which the service is provided. For example, the information may indicate a group communication channel of the data path group network, a lifetime value corresponding to the data path group network, and/or a heartbeat value corresponding to the data path group network. The lifetime value may indicate a time period during which the service is to be available via the data path group network. The heartbeat value may indicate a duration of time that a device of the data path group network is to remain associated with the data path group network in the absence of receiving a message related to the data path group network. The first device may transmit the message to one or more devices within communication range of the first device. For example, the first device may broadcast the message via a particular communication channel (of a wireless network) that is different than the group communication channel of the data path group network. The message may be transmitted, via the particular communication channel of the wireless network, during a discovery window of the wireless network.

A second device may join the data path group network in response to receiving the message. For example, the second device may send an authentication request to the first device and may receive a group key of the data path group network. The second device may set a lifetime counter based on the lifetime value and/or may set a heartbeat counter based on the heartbeat value. While the lifetime counter is unexpired, the second device may periodically update the lifetime counter. For example, while the lifetime counter is greater than zero, the second device may periodically decrement the lifetime counter. Additionally or alternatively, while the heartbeat counter is unexpired, the second device may periodically update the heartbeat counter. For example, while the heartbeat counter is greater than zero, the second device may periodically decrement the heartbeat counter.

While joined to the data path group network, the second device may monitor the group communication channel of the data path group network during group paging windows of the data path group network. For example, the message may indicate a frequency of group paging windows and/or a duration a group paging window. Each group paging window may be part of a group transmission window that includes the group paging window followed by a group data window. After the second device joins the data path group network, the first device may send data corresponding to the service to the second device. For example, the first device may generate a traffic indication message (TIM). The TIM may indicate to the second device that the first device has data (corresponding to the service) to send to the second device. The first device may transmit the TIM during a first group paging window.

The second device may receive the TIM during the first group paging window. In response to receiving the TIM indicating that the first device has the data to send, the second device may monitor the group communication channel of the data path group network during a group data window that follows the first group paging window. The first device may transmit the data to the second device during the group data window.

In response to determining that at least one of the lifetime counter and the heartbeat counter is expired, the second device may disassociate from the data path group network. For example, the second device may not monitor the group communication channel of the data path group network. To illustrate, the second device may cease monitoring the group communication channel of the data path group network during group paging windows of the data path group network. Additionally or alternatively, after disassociating from the data path group network and during a group paging window of the data path group network, the second device may enter a sleep mode, monitor a second group communication channel of a second data path group network, monitor a particular communication channel of the wireless network, or may broadcast a message via the particular communication channel, as illustrative, non-limiting examples.

In some implementations, the first device may be configured to operate as a provider device that provides the service to other devices of the data path group network. For example, the first device may be a music provider device and may wirelessly provide audio streaming to other devices. As another example, the first device may have access to a particular service via a particular network, such as a wireless network or a cellular network, and may receive service data, such as audio data, video data, or other data). The first device may operate as a provider device by forwarding the service data to devices of the data path group network that may otherwise not have access to the particular service via the particular network.

In a particular aspect, the first device may act as a proxy device of the service provided by a provider device of the data path group network. For example, the first device may receive and forward data (corresponding to the service) from the provider device of the data path group network. To illustrate, prior to generating the message, the first device may receive a second message from the provider device of the service. In this illustrative example, the first device may generate the message in response to receiving the second message. The data corresponding to the service may be generated by the provider device (of the data path group network) and may be wirelessly transmitted by the first device to the second device. In some implementations, the data may be wirelessly transmitted from the provider device to the second device via multiple proxy devices of the data path group network.

One particular advantage provided by at least one of the disclosed aspects is that the data path group network may securely and efficiently provide a service, such as a proximity-based service, to multiple devices. The disclosed techniques may enable single-hop and/or multi-hop service discovery and may reduce a number of messages exchanged between devices to join the data path group network. The disclosed techniques may also enable one or more devices of the data path group network to disassociate from the data path group network with reduced overhead. For example, the one or more devices may implicitly disassociate from the data path group network without sending disassociation messages to other devices of the data path group network.

Referring to FIG. 1, a system that includes devices of a data path group network is shown and generally designated 100. The system 100 includes a wireless network 101, such as a neighbor aware network (NAN). The system 100 includes a first device 110, a second device 120, and a third device 130. The devices 110, 120, 130 may be included in a device cluster, such as a data path group that corresponds to the data path group network. The data path group network may include the wireless network 101 or a subset of the wireless network 101. Although the system 100 is illustrated as including three devices, the system 100 may include more than three devices or fewer than three devices.

Each of the devices 110, 120, 130 may be a wireless communication device configured to wirelessly transmit data and/or to wirelessly receive data from one or more other wireless communication devices included in the wireless network 101. The wireless network 101 may be an infrastructure network or an infrastructure-less network, such as a peer-to-peer network or an ad-hoc network, as illustrative, non-limiting examples. For example, each of the devices 110, 120, 130 of the wireless network 101 may be configured to perform association operations (e.g., security association operations), security information exchange operations, synchronization operations, and other operations via one or more wireless channels corresponding to the wireless network 101. In some implementations, the devices 110, 120, 130 may perform such operations in accordance with one or more standards, such as an Institute of Electrical and Electronics Engineers (IEEE) 802.11 standard (e.g., a IEEE 802.11s standard), a Wi-Fi Alliance standard, and/or another standard (e.g., an infrastructure-less network standard), as illustrative, non-limiting examples. For example, the devices 110, 120, 130 of the system 100 may be configured to communicate wirelessly according to one or more wireless communication protocols. To illustrate, the devices 110, 120, 130 may send and receive messages, such as beacon messages, in connection with an IEEE 802.11 protocol. In another example, the devices of the system 100 may communicate data, such as data that corresponds to a particular application or service.

The wireless network 101 may include or correspond to one or more data path group networks. As used herein, a data path group network may include an infrastructure-less peer-to-peer network, such as an ad-hoc network. The data path group network may also be referred to as a group network, a data link network, a NAN data link (NDL) network, or a NAN data path group network. In some implementations, the data path group network may include a mesh network, as an illustrative, non-limiting example. The data path group network may include multiple devices that are able to form a network, such as a decentralized wireless network. Additionally, each device of the data path group network may use shared security credentials. The shared security credentials may be wirelessly communicated (e.g., exchanged between devices) in band or out of band of one or more group communication channels of the data path group network. In some implementations, the devices of the data path group network may be synchronized to have periodic wake-up times, such as time periods when each of the devices is awake to advertise a service and/or to receive traffic and other messages.

The wireless network 101 may include or correspond to a data path group network that includes the devices 110, 120, 130. In a particular illustrative implementation, the data path group network may include a wireless mesh network, such as a "social Wi-Fi mesh" network, or a subset of the wireless mesh network, as an illustrative, non-limiting example. As part of the data path group network, the devices 110, 120, 130 may perform data exchanges via wireless communications. In some implementations, the data exchanges may not involve one or more wireless carriers, one or more Wi-Fi access points, and/or the Internet. For example, the devices 110, 120, 130 of the data path group network may share a security credential, such as a group key, to enable communication. To illustrate, each device of the data path group network may use the group key to encode and/or decode group messages. Additionally or alternatively, the devices 110, 120, 130 of the data path group network may be synchronized in time and may have defined wake up time periods (e.g., group paging windows). Each of the devices 110, 120, 130 may be configured to send and/or receive group traffic during the time periods. The group traffic may include group messages encoded using the group key 124 of the data path group network.

In some implementations, one or more services may be provided by one or more of the devices 110, 120, 130 of the data path group network to other devices of the data path group network. The one or more services may include a music service, a social media sharing service, a file sharing service, and/or a data sharing service, as illustrative, non-limiting examples. Additionally or alternatively, the one or more services may include another service, such as a streaming service that is received at a provider device of the data path group network and forwarded to other devices of the data path group network.

Each data path group network of the wireless network 101 may have a corresponding group identifier, such as a unique value. For example, the group identifier may include a byte value and/or a group address. Although the data path group network is described as including three devices, in other implementations the data path group network may include more than three devices or fewer than three devices. In some implementations, when the wireless network 101 includes multiple data path group networks, a particular device of the wireless network 101 may be included in more than one data path group network.

In some implementations, a provider device of the data path group network may be configured to provide a service to other devices of the data path group network. For example, the provider device may be located at a business and may be configured to provide advertisements to other devices (that join the data path group network) that are within a particular distance of the business. To illustrate, a provider device located at a restaurant may be configured to broadcast daily specials of the restaurant to other devices within communication range of the provider device. In some implementations, the first device 110 may be the provider device. In other implementations, the first device 110 may be a proxy device, such as a device that forwards data to and from the provider device.

As another example, the first device 110 may operate as a provider device by receiving service data, such as audio data, video data, or other data, and by forwarding the service data to devices that may otherwise not have access to the service data. To illustrate, the first device 110 may have access to a particular network. The particular network may include a wireless network or a cellular network, as illustrative, non-limiting examples. The first device 110 may provide access to the particular network to devices that do not have access to the particular network, such as devices that are outside a range of the network, do not have a password to access the network, etc. Stated differently, the first device 110 may introduce the service data to the data path group network to make the service data available to other devices of the data path group network. For example, a user of the first device 110 at an airport may use the first device 110 to access a cellular network to receive a weather news stream. During an extreme weather event, multiple users at the airport may attempt to receive the same weather news stream; however, the cellular network may not have bandwidth to meet the high network demand. In this example, the first device 110 may operate as a provider device of a particular data path group network and may forward data to the devices of the other users that join the particular data path group network so that the other users at the airport may receive the weather news stream without having to access the cellular network.

In some implementations, the third device 130 may be a provider device of a service of the data path group network and the first device 110 may be a proxy device (of the data path group network) of the service. To illustrate, the first device 110 (e.g., the proxy device) may be configured to receive data from the provider device (e.g., the third device 130) of the service and may forward the data to other devices. The first device 110 may be within communication range of the third device 130 or may be multiple hops away from the third device 130. In this aspect, a device (e.g., the second device 120) that is not within a communication range of the provider device (e.g., the third device 130) of the service may receive data from the provider device via a proxy device (e.g., the first device 110). Although the third device 130 has been described as being the provider device, in other implementations, more than one device may be considered a provider device. For example, the second device 120 and/or the third device 130 may be provider devices. In some implementations, a device of the data path group network may be both a provider device and a proxy device (for another provider device of the data path group network).

The first device 110 may include a group networking module 102, a receiver 104, a transmitter 106, group data 108, or a combination thereof. In a particular implementation, the second device 120 and/or the third device 130 may also include at least one of a group networking module 102, a receiver 104, a transmitter 106, and group data 108. The group data 108 of each of the devices 110, 120, 130 may include at least one of a group key 124 and a counter(s) 121. For example, the counter(s) 121 may include a lifetime counter 122, a heartbeat counter 126, or both. The transmitter 106 of each of the devices 110, 120, 130 may be configured to wirelessly transmit data (e.g., messages) to other devices of the data path group network. The receiver 104 of each of the devices 110, 120, 130 may be configured to wirelessly receive data from other devices of the data path group network. The group networking module 102 of each of the devices 110, 120, 130 may be configured to perform one or more functions described herein with reference to operation of the device as part of the data path group network. For example, the group networking module 102 may include circuitry and/or hardware configured to perform the one or more functions. To illustrate, the group networking module 102 may include a processor and a memory coupled to the processor. The memory may include one or more processor executable instructions that, when executed by the processor, cause the processor to perform one or more of the functions described herein.

During operation, the first device 110 may generate a first message 150. The first message 150 may include group attribute(s) data 180 corresponding to the data path group network. For example, the group attribute(s) data 180 may be included in a service discovery field of the first message 150. In some implementations, the first message 150 may include or correspond to a discovery message, such as a beacon message, that enables service discovery. The group attribute(s) data 180 may include and/or indicate information corresponding to the data path group network. For example, the group attribute(s) data 180 may include a lifetime value 134, a heartbeat value 136, or both, as described herein. Additionally or alternatively, the group attribute(s) data 180 may include and/or indicate other information, such as data that indicates a group communication channel and/or a transmission schedule of the data path group network, as described with reference to FIG. 3.

In some implementations, the group attribute(s) data 180 may indicate availability of a service of the data path group network. The service may include an audio streaming service, a video streaming service, or a service that provides other data, as illustrative, non-limiting examples. In some implementations, the service may correspond to a particular application of the first device 110.

When the group attribute(s) data 180 includes the lifetime value 134, the lifetime value 134 may indicate a time duration during which the service is expected to be available via the data path group network. The lifetime value 134 may be a default value, may be received as user input from a user of the first device 110, or may be received from another device (such as the third device 130). When the group attribute(s) data 180 includes the heartbeat value 136, the heartbeat value 136 may indicate how long a device (such as the second device 120) that receives the first message 150 is to stay associated with the data path group network in the absence of receiving a subsequent message. The heartbeat value 136 may be a default value, may be received as user input from a user of the first device 110, or may be received from another device (such as the third device 130).

In some implementations, the lifetime value 134 and/or the heartbeat value 136 may be received at the first device 110 from a user of the first device 110. For example, the user of the first device 110 may provide user input indicating a particular duration that the first device 110 may provide the service. The first device 110 may set a lifetime counter 122 (of the first device 110) to a particular value based on the particular duration and may generate the lifetime value 134 based on the particular duration. As another example, the heartbeat value may be received as a user input (received from a user of the first device 110) that indicates a second particular duration. The first device 110 may set a heartbeat counter 126 (of the first device 110) to a second particular value based on the second particular duration and may generate the heartbeat value 136 based on the second particular duration. When the lifetime counter 122 of the first device 110 and/or the heartbeat counter 126 of the first device 110 expires, the first device 110 may disassociate from the data path group network.

The first device 110 may initiate transmission, via the transmitter 106, of the first message 150. For example, the transmitter 106 may broadcast the first message 150 via a particular communication channel of the wireless network 101. In some implementations, the first message 150 may be a beacon message that complies with an IEEE 802.11 protocol. In some implementations, the first message 150 may be sent during a discovery window of the wireless network 101. Additionally or alternatively, the first device 110 may periodically transmit the first message 150. For example, the first device 110 may transmit the first message 150 during multiple discovery windows.

The second device 120 may receive the first message 150 from the first device 110. For example, the second device 120 may receive the first message 150 during a discovery window. In response to receiving the first message 150, the second device 120 may join the data path group network. For example, the second device 120 may send a request 158 to the first device 110 via a group communication channel of the data path group network. The group communication channel of the data path group network may be a different channel than the particular communication channel (e.g., a NAN communication channel) of the wireless network 101.

In some implementations, the second device 120 may wirelessly transmit the request 158 during a group transmission window that is subsequent to the discovery window. For example, the group transmission window may include a first portion and a second portion. The first portion may correspond to a group paging window, and the second portion may correspond to a group data window. The second device 120 may send the request 158 during a particular group paging window after the discovery window. Devices of the data path group network may switch to (or remain in) an active mode during group paging windows of the data path group network to exchange routing messages, authentication messages, association messages, traffic indication messages, etc., as illustrative, non-limiting examples. In some implementations, the group attribute(s) data 180 of the first message 150 may indicate a transmission schedule, such as scheduling data, that indicates timing and a duration of the group paging windows of the data path group network, as described with reference to FIG. 3. The second device 120 may determine the timing and the duration of the group paging windows of the data path group network based on the transmission schedule.

In response to receiving the request 158 and successfully authenticating the second device 120, the first device 110 may send a group key 124 to the second device 120. In some implementations, the first device 110 may generate the group key 124, e.g., using an encryption key generation algorithm. The group key 124 may be used by the devices (e.g., the first device 110, the second device 120, and the third device 130) of the data path group network to encrypt and decrypt messages exchanged via the group communication channel of the data path group network. As an illustrative, non-limiting example, the group key 124 may be used to encrypt and decrypt routing messages (e.g., a path request (PREQ) message and/or a path reply (PREP) message), authentication messages (e.g., the request 158), new group key announcements, explicit disassociation messages, or a combination thereof, exchanged using the group communication channel of the data path group network. In some implementations, the device (e.g., the first device 110, the second device 120, and the third device 130) of the data path group network may use the group key 124 to encrypt and decrypt data exchanged via the group communication channel of the data path group network during group transmission windows, such as during group paging windows and/or during group data windows.

A device of the data path group network may set the lifetime counter 122 to a particular value based on the lifetime value 134, a default lifetime value, or both. For example, after joining the data path group network, the second device 120 may set the lifetime counter 122 of the second device 120 based on the lifetime value 134, the default value, or both. To illustrate, the second device 120 may set the lifetime counter 122 based on the default lifetime value in response to determining that the first message 150 does not indicate the lifetime value 134 or that the lifetime value 134 is a particular value, such as a value equal to zero. As another example, the first device 110 may set the lifetime counter 122 of the first device 110 based on the lifetime value 134, the default value, or both. To illustrate, the first device 110 may set the lifetime counter 122 based on the default value in response to determining that the first device 110 did not receive the lifetime value 134 (or an input corresponding to the lifetime value 134) from another device of the data path group network or from a user of the data path group network.

One or more devices of the data path group network may periodically determine whether its lifetime counter 122 is expired. For example, the second device 120 may determine that the lifetime counter 122 of the second device 120 is expired if a value of the lifetime counter 122 of the second device 120 is equal to zero. In response to determining that its lifetime counter 122 is unexpired, the second device 120 may update (e.g., decrement) the lifetime counter 122 and may continue to participate in the data path group network. To illustrate, the second device 120 may continue to participate in the data path group network by switching to an active mode during group paging windows and monitoring the group communication channel of the data path group network during the group paging windows.

One or more devices of the data path group network may set its heartbeat counter 126 to a particular value based on the heartbeat value 136, a default heartbeat value, or both. For example, the second device 120 may set its heartbeat counter 126 based on the default heartbeat value in response to determining that the first message 150 does not indicate the heartbeat value 136 or that the heartbeat value 136 is a particular value, such as a value equal to zero.

One or more devices of the data path group network may periodically determine whether its heartbeat counter 126 is expired. For example, in response to determining that the heartbeat counter 126 of the second device 120 is unexpired, the second device 120 may update (e.g., decrement) its heartbeat counter 126 and may continue to participate in the data path group network. The second device 120 may continue to participate in the data path group network by switching to an active mode during group paging windows and monitoring the group communication channel of the data path group network during the group paging windows. The second device 120 may disassociate from the data path group network, as described herein, in response to determining that its lifetime counter 122, heartbeat counter 126, or both, are expired.

In some implementations, the second device 120 may set (or reset) the heartbeat counter 126 in response to each message received from another device of the data path group network. For example, the second device 120 may reset the heartbeat counter 126 by updating the heartbeat counter 126 to a new value. Each received message by the second device 120 may indicate a corresponding lifetime value. In some implementations, the second device 120 may set (or update) the lifetime counter 122 to a particular value based on a largest (e.g., longest duration) of the lifetime values included in the received messages. For example, if a first received message indicates that the data path group is to expire at 6 PM and a second received message indicates that the data path group is to expire at 8 PM, the second device 120 may set (or reset) its lifetime counter 122 based on second received message.

When first device 110 has data (e.g., data 156) to send to the second device 120 (or to another device of the data path group network), the first device 110 may generate a traffic indication message (TIM) 154. The data 156 may correspond to the service advertised by the first message 150. In some implementations, the first device 110 may be a provider device of the service. For example, the first device 110 may introduce the data 156 that corresponds to the service to the data path group network. In other implementations, the first device 110 may be a proxy device of the service. For example, the first device 110 may receive the data 156 from another device (such as the third device 130) of the data path group network and may forward the data 156 to another device of the data path group network. In some implementations, the TIM 154 may indicate a particular device of the data path group network that is to receive the data 156.

In some implementations, the first device 110 may generate (or receive) the data 156, may store the data 156 in a memory (not shown) of the first device 110), and may generate the TIM 154. The first device 110 may transmit the TIM 154 during a group paging window of the data path group network. The first device 110 may encrypt the TIM 154 using the group key 124 prior to wirelessly transmitting the TIM 154 to the second device 120 using the group communication channel of the data path group network. In some implementations, the first device 110 may broadcast the TIM 154 to devices of the data path group network that are within communication range of the first device 110.

If the second device 120 does not receive a TIM during the group paging window, the second device 120 may not monitor the group communication channel of the data path group to receive data during a subsequent group data window that immediately follows the group paging window. For example, if the second device 120 does not receive a TIM during the group paging window, the second device 120 may switch to a sleep mode during the subsequent group data window. Additionally or alternatively, if the second device 120 does not receive a TIM during the group paging window, the second device 120 may monitor a second communication of a second data path group network, wirelessly transmit one or more messages via the group communication channel of the data path group, monitor a particular communication channel of the wireless network 101 during the subsequent group data window.

If the second device 120 receives the TIM 154 via the group communication channel during the group paging window, the second device 120 may determine whether the TIM 154 indicates that the first device 110 has data to send to the second device 120. In response to determining that the TIM 154 indicates that the first device 110 does not have data to send to the second device 120 and determining that the second device 120 does not have data to send to another device of the data path group network, the second device 120 may not monitor the group communication channel (of the data path group network) during a subsequent (or remaining) group data window. For example, the second device 120 may switch to (or remain in) a sleep mode during the group data window. Additionally or alternatively, in response to determining that the TIM 154 indicates that the first device 110 does not have data to send to the second device 120, the second device 120 may monitor a second communication of a second data path group network, wirelessly transmit one or more messages via the group communication channel of the data path group, monitor a particular communication channel of the wireless network 101 during the subsequent group data window.

In response to determining that the TIM 154 indicates that the first device 110 has data to send to the second device 120 or determining the second device 120 has data to send to another device, the second device 120 may monitor the group communication channel of the data path group network during the group data window of the data path group network that immediately follows the group paging window. For example, the second device 120 may remain in (or switch to) an active mode during a subsequent (or remaining) group data window.

The first device 110 may transmit the data 156 during the group data window. The data 156 may correspond to the service. In some implementations, the first device 110 may encrypt the data 156 using the group key 124. In other implementations, the data 156 may be encrypted using a pairwise key shared between the first device 110 and the second device 120. The second device 120 may receive the data 156 during the group data window.

In some implementations, if the second device 120 does not receive the data 156 from the first device 110 after receiving the TIM 154 indicating that the first device 110 has the data 156 for the second device, the second device 120 may send a request 158 to another device of the data path group network. For example, the second device 120 may send the request 158 to the other device in response to determining that the data 156 has not been received from the first device 110 within a particular duration of receiving the TIM 154. To illustrate, the first device 110 may have disassociated from the data path group network without sending the data 156 to the second device 120. In some implementations, the second device 120 may send the request 158 to the other device in response to receiving a disassociation message from the first device 110.

In some implementations, after sending the request 158 to the first device 110 and associating with the first device 110, the second device 120 determines whether the second device 120 has received service data, such as the data 156, from the first device 110. In response to determining that the second device 120 has not received service data (corresponding to the service of the data path group network) from the first device 110, the second device 120 may send a request 158 to a device of the data path group network other than the first device 110. For example, the second device 120 may attempt to associate with the another device in response to determining that service data has not been received from the first device 110 within a particular duration after associating with the first device 110.

In some implementations, the first device 110 may be a provider device of the service. For example, the first device 110 may introduce data, such as service data, that corresponds to the service of the data path group network. In other implementations, the first device 110 may be a proxy device of the service. For example, the first device 110 may receive the data 156 corresponding to the service from another device (e.g., the third device 130) of the data path group network and may forward the data 156. In this implementation, the first device 110 may generate the first message 150 in response to receiving, via the receiver 104 of the first device 110, the second message 152 from the other device (e.g., the third device 130). The other device may be a provider device of the service or may be a proxy device of the service.

The second message 152 may include second data for indicating the lifetime value 134 and/or the heartbeat value 136. For example, the third device 130 may determine the lifetime value 134 based on a default lifetime value, a user input corresponding to the lifetime value, an average lifetime value over a particular time range, or a combination thereof. The first device 110 may set the lifetime counter 122 (of the first device 110) based on the lifetime value 134 indicated by the second message 152. In some implementations, such as when the lifetime value 134 corresponds to a particular time (e.g., 1 PM), the lifetime value 134 indicated by the second message 152 may be the same value as the lifetime value 134 indicated by the first message 150. In other implementations, such as when the lifetime value 134 corresponds to a duration (e.g., a countdown value), the lifetime value 134 indicated by the second message 152 may be a different value than the lifetime value 134 indicated by the first message 150. Thus, the first device 110 may receive multiple messages indicating different lifetime values. In this situation, the first device 110 may set the lifetime counter 122 of the first device 110 based on the particular lifetime value of the different lifetime values that indicates a longest duration.

In some implementations, the first device 110 may set (or reset) the heartbeat counter 126 in response to receiving the second message 152. For example, the first device 110 may set the heartbeat counter 126 based on a default heartbeat value, a user input corresponding to a heartbeat value, the heartbeat value 136 indicated in the second message 152, or a combination thereof. In some implementations, the first device 110 may set the heartbeat counter 126 (of the first device 110) based on the default heartbeat value in response to determining that the second message 152 does not indicate the heartbeat value 136 or that the heartbeat value 136 of the second message 152 is a particular value, such as a value equal to zero.

In some implementations, a device (e.g., the first device 110, the second device 120, or the third device 130) may disassociate from the data path group network. For example, the device may implicitly disassociate from the data path group network. To illustrate, the device may disassociate from the data path group network without sending an explicit disassociation message to devices of the data path group network. As another example, the device may explicitly disassociate from the data path group network. To illustrate, the device may send, via the transmitter 106, a disassociation message indicating that the device is disassociating from the data path group network. The device may broadcast the disassociation message to devices of the wireless network 101. Additionally or alternatively, the device may send the disassociation message by transmitting the disassociation message over the group communication channel of the data path group network during a group paging window of the data path group network. The device may encrypt the disassociation message using the group key 124.

As part of disassociating with the data path group network, either implicitly or explicitly, the device may remove or cease maintaining memory allocations related to the data path group network. The memory allocations may correspond to at least one of a device list identifying a plurality of devices associated with the data path group network, the group key 124, the lifetime counter 122, the heartbeat counter 126, or a combination thereof, as illustrative, non-limiting examples.

In some implementations, the device may disassociate from the data path group network in response to determining that the lifetime counter 122 is expired, that the heartbeat counter 126 is expired, that an application corresponding to the service is deactivated at the device, that a user request to disassociate is received, that the device is being turned off, that the device is in a low power mode, or a combination thereof. The device may disassociate from the data path group network by transmitting a disassociation message, removing or ceasing to maintain memory allocations related to the data path group network, or both.

As a specific example, the third device 130 may receive a user input at a first time (e.g., noon) indicating a particular duration (e.g., 1 hour or until 1 PM) that the service is to be made available to the data path group network via the third device 130. The third device 130 may send a second message 152 at a second time (e.g., 12:01 PM). The second message 152 may include the second data (e.g., second group attribute(s) data) for indicating a lifetime value 134 (e.g., 1 PM) based on the particular duration, a heartbeat value 136 (e.g., 5 minutes) based on a default heartbeat value, or both.

The first device 110 may receive the second message 152 and may set the lifetime counter 122 of the first device 110 at a third time (e.g., 12:03 PM) to a particular value (e.g., 57 minutes) based on a default lifetime value, the lifetime value 134 (e.g., 1 PM) of the second message 152, or both. Additionally or alternatively, the first device 110 may set the heartbeat counter 126 of the first device 110 at the third time (e.g., 12:03 PM) to a particular value (e.g., 5 minutes) based on a default heartbeat value, the heartbeat value 136 (e.g., 5 minutes) of the second message 152, or both.

The first device 110 may send the first message 150 including the first data (e.g., the group attribute(s) data 180) for indicating the lifetime value 134 (e.g., 1 PM), the heartbeat value 136 (e.g., 5 minutes), or both. For example, the first device 110 may set the lifetime value 134 of the first message 150 based on the default lifetime value, the lifetime value 134 of the second message 152, or both. As another example, the first device 110 may set the heartbeat value 136 of the first message 150 based on the default heartbeat value, the heartbeat value 136 of the second message 152, or both.

The second device 120 may set the lifetime counter 122 of the second device 120 at a fourth time (e.g., 12:04 PM) to a particular value (e.g., 56 minutes) based on a default lifetime value, the lifetime value 134 of the first message 150, or both. In some implementations, the default lifetime value at the second device 120 may be distinct from the default lifetime value at the first device 110. In other implementations, the default lifetime values at the second device 120 and the first device 110 may be same. Additionally or alternatively, the second device 120 may set the heartbeat counter 126 of the second device 120 at the fourth time to a particular value (e.g., 5 minutes) based on a default heartbeat value, the heartbeat value 136 of the first message 150, or both. In some implementations, the default heartbeat value at the second device 120 may be distinct from the default heartbeat value at the first device 110. In other implementations, the default heartbeat values at the second device 120 and the first device 110 may be same.

Each of the first device 110 and the second device 120 may periodically update its own lifetime counter 122 and/or its own heartbeat counter 126. For example, if the lifetime counter 122 and/or the heartbeat counter 126 is set to a corresponding durational countdown value, the lifetime counter 122 and/or the heartbeat counter 126 may be periodically updated by decrementing the lifetime counter 122 and/or the heartbeat counter 126 at a predetermined rate. In some implementations, the lifetime counter 122, the heartbeat counter 126, or both, may indicate particular times instead of remaining durations. For example, the heartbeat counter 126 of the first device 110 may indicate a first heartbeat expiration time (e.g., 12:08 PM) and the lifetime counter 122 of the first device 110 may indicate a lifetime expiration time (e.g., 1 PM). As another example, the heartbeat counter 126 of the second device 120 may indicate a second heartbeat expiration time (e.g., 12:09 PM) and the lifetime counter 122 of the second device 120 may indicate the lifetime expiration time (e.g., 1 PM). If the lifetime counter 122 is set to a corresponding time, the lifetime counter 122 may be periodically compared to a time of a clock to determine if the lifetime counter 122 and/or the heartbeat counter 126 is expired. Additionally or alternatively, if the heartbeat counter 126 is set to a corresponding time, the heartbeat counter may be periodically compared to a time of a clock to determine if the heartbeat counter 126 is expired.

One or more devices of the data path group network may set or reset (update) its heartbeat counter 126 responsive to receiving a particular message. For example, the first device 110 may set or reset (e.g., update) its heartbeat counter 126 in response to each message corresponding to the data path group network that is received by the first device 110. To illustrate, a provider device (such as the third device 130) may periodically (e.g., every 5 minutes) send a message, such as the second message 152. The first device 110 may set or reset the heartbeat counter 126 of the first device 110 in response to receiving the message (e.g., the second message 152). For example, the first device 110 may set or reset the heartbeat counter 126 to a particular value (e.g., 5 minutes or 12:08 PM) at a first time (e.g., 12:03 PM) in response to receiving a particular message (e.g., the second message 152) from a particular device (such as the third device 130). Additionally or alternatively, the first device 110 may set or reset the heartbeat counter 126 of the first device 110 to a second value (e.g., 5 minutes or 12:11 PM) at a second time (e.g., 12:06 PM) in response to receiving another message (e.g., another discovery message) from the particular device or from another device.

In some implementations, the third device 130 may implicitly disassociate from the data path group network at a first time (e.g., 12:10 PM) that is prior to expiration of the lifetime counter 122. For example, the third device 130 may disassociate from the data path group network in response to receiving a user request to disassociate or in response to determining that a particular application has been deactivated at the third device 130. After the third device 130 disassociates from the data path group network, the first device 110 may not receive another message, such as another discovery message, corresponding to the data path group network prior to expiration of the heartbeat counter 126. Accordingly, the first device 110 may disassociate from the data path group network in response to determining that the heartbeat counter 126 is expired. For example, the first device 110 may disassociate from the data path group network at a first time (e.g., 12:13 PM) which is prior to expiration of the lifetime counter 122 at a later time (e.g., 1 PM). The first device 110 may not send messages via the data path group network, such as the first message 150, once the first device 110 has disassociated from the data path group network. The second device 120 may disassociate from the data path group network in response to determining that the heartbeat counter 126 of the second device 120 is expired. For example, the second device 120 may disassociated from the data path group, prior to expiration of the lifetime counter 122, if the heartbeat counter 126 is expired. Thus, if the provider device(s) (e.g., the third device 130) corresponding to the service stop participating in the data path group network, other devices (e.g., the first device 110, the second device 120, or both) of the data path group network may disassociate from the data path group network based on the heartbeat counter 126 without the provider device(s) having to send explicit disassociation messages and, if the devices have set the lifetime counter 122 to a particular value, without waiting for the lifetime counter 122 to expire.

After a device disassociates from the data path group network, the device may stop monitoring the group communication channel of the data path group network. For example, the device may remain in a sleep mode during group paging windows of the data path group network. The sleep mode may be a lower power mode than an active mode of the device. Alternatively, monitor a second group communication channel of a second data path group network, monitor a particular communication channel of the wireless network, may transmit a message to another device of the wireless network 101, and/or may broadcast a message via the particular communication channel of the wireless network 101, as illustrative, non-limiting examples.

In some implementations, the provider device (e.g., the third device 130) may set the lifetime value 134 during the second message 152 and may update a lifetime (e.g., a lifetime value) of the data path group network using a message that is transmitted to devices of the data path group network subsequent to the second message 152. For example, if the provider device is providing data (e.g., the data 156) and the lifetime of the data path group network is about to end, the provider device may send a discovery message that includes a new lifetime value to extend the lifetime of the data path group network. The provider device may repeatedly extend the lifetime of the data path group network if the provider device has service data to be provided to at least one device of the data path group network. Alternatively, if the provider device does not have service data to provide, the provider device may let the data path group network expire according to a most recently communicated lifetime value.

In some implementations, the lifetime (e.g., the lifetime value 134) of the data path group network may be used to coordinate a transition time (e.g., a boundary point) at which one or more parameters of the data path group network may be updated and/or changed. For example, a lifetime of the data path group network may be configured to end at a first time. A provider device of the data path group network may generate and transmit, to the devices of the data path group network, a particular message, such as a particular discovery message, that indicates that the lifetime is to be extended from the first time to a second time. The particular message may also indicate that, at the first time, the devices of the data path group network are to change a group communication channel of the data path group network, merge the data path group network with another data path group network, change one or more values of the transmission schedule of the data path group network, change a group key, or a combination thereof, as illustrative, non-limiting examples. In other implementations, the lifetime of the data path group network may be extended and the one or more parameters may be maintained with no changes. By using the lifetime of the data path group network as a coordinated transition time, the devices of the data path group network do not have to send additional messages to negotiate a time to change the one or more parameters of the data path group network, which may reduce messaging overhead of the data path group network.

In some implementations, the data path group network may include multiple provider devices, such as a first provider device (e.g., the third device 130) and a second provider device. Each of the provider devices may provide the same service or a different service. The first provider device may set and distribute (to devices of the data path group network) a first lifetime value of the data path group network, and the second provider device may set and distribute a second lifetime value. For example, the first lifetime value may be equal to 5 seconds, and the second lifetime value may be equal to 8 seconds, as illustrative, non-limiting examples. The second provider device may receive a first particular message (e.g., a first particular service discovery message) that indicates the lifetime value set by the first provider device, and the first provider device may receive a second particular message (e.g., a second particular service discovery message) that indicates the lifetime value set by the second provider device.

In response to receiving the second particular message at the first provider device, the first provider device may determine that the second lifetime value set by the second provider device is longer (e.g., greater) than the first lifetime value set by the first provider device. In response to the second lifetime value set by the second provider device exceeding the first lifetime value set by the first provider device, the first provider device may update its lifetime value to coincide with the second lifetime value set by the second provider device. If the first provider device does not have service data to distribute prior to the end of lifetime (corresponding to the 8 second lifetime value) of the data path group network, the first provider device may disassociate from the data path group network at any time after determining that the first provider device does not have service data to distribute.

In response to receiving the first particular message at the second provider device, the second provider device may determine that the second lifetime value set by the second provider device is longer (e.g., greater) than the first lifetime value set by the first provider device. Based on the second lifetime value set by the second provider device exceeding the first lifetime value set by the first provider device, the second provider device may be responsible for extending the lifetime of the data path group network. For example, if the second provider device determines to extend the lifetime of the data path group network, the second provide device may generate a new message, such as a new service discovery message, that indicates to extend the lifetime of the data path group network and may transmit the new message to the devices of the data path group network.

In some implementations, a message, such as the first message 150 or the second message 152, may include information (e.g., the first data of the first message 150 or the second data of the second message 152) regarding a provider device of the service. For example, the message may indicate a hop count corresponding to the provider device, a media access control (MAC) address of a sender of the message and/or of the provider device of the service, or both. For example, if the third device 130 is a provider device of the service, the hop count of the second message 152 may indicate a number (e.g., 1) of hops between the third device 130 and the first device 110, and the MAC address may indicate a MAC address of the third device 130. In this implementation, the first device 110 may be a proxy device of the service.

The first device 110 may generate the first message 150 based on the second message 152. For example, the first data of the first message 150 may indicate a hop count that is a number of hops (e.g., 2) from the third device 130 via the first device 110 to the second device 120. In some implementations, the first device 110 may generate the hop count of the first message 150 by incrementing the hop count of the second message 152.

The MAC address of the first message 150 may indicate the MAC address of the provider device (e.g., the third device 130) of the service. In some implementations, the first device 110 may generate the MAC address of the provider device of the first message 150 by copying the MAC address of the provider device from the second message 152.

In some implementations, the second device 120 may determine a route to the provider device (e.g., the third device 130) of the service based on the MAC address of the provider device. For example, the second device 120 may broadcast a path request (PREQ) message that includes address data that indicates the MAC address of the provider device. The second device 120 may encrypt the PREQ message using the group key 124. One or more PREQ messages may propagate to the provider device via other devices of the data path group network.

The second device 120 may receive path replies (PREPs) from one or more devices of the data path group network. The PREPs may be encrypted using the group key 124. The PREPs may indicate routes to the third device 130 corresponding to the MAC address of the third device 130 (e.g., the provider device). For example, a particular PREP may indicate a particular hop count to the third device 130. The second device 120 may determine a particular path to the third device 130 based on the PREPs. For example, the second device 120 may determine a particular path to the third device 130 based on hop counts indicated by the PREPs, based on values of a particular network metric (e.g., a bandwidth metric, a packet drop rate, etc.) indicated by the PREPs, or both. In some implementations, the second device 120 may establish a pairwise unicast key with a device (e.g., the first device 110) on the particular path. The device that the second device 120 establishes the pairwise unicast key with may be the same device from which the second device 120 received a PREP corresponding to the particular path that is selected by the second device 120. In this implementation, after the pairwise unicast key is established, the first device 110 may encrypt the data 156 based on the pairwise unicast key prior to sending the data 156 to the second device 120.

In some implementations, the first device 110 (or the second device 120) may discard a message (e.g., the first message 150 or the second message 152) in response to determining that the hop count of the message fails to satisfy a particular hop threshold. For example, the hop count may indicate that an end-to-end latency corresponding to data received from an originator of the message is likely to be too high. In some implementations, the hop count of the message may fail to satisfy the particular hop threshold if the hop count is greater than the particular hop threshold.

The system 100 may enable single-hop and/or multi-hop service discovery. For example, the second device 120 may discover that the service (corresponding to the data path group network) is available via the first device 110 from the third device 130. The system 100 may also reduce a number of messages exchanged between devices to join and/or disassociate from a data path group network. For example, based on expiration of the heartbeat counter 126 or the lifetime counter 122, the first device 110 may implicitly disassociate from the data path group network without sending disassociation messages.

Referring to FIG. 2, a diagram of an example of a group attribute is shown and generally designated 200. In some implementations, the group attribute 200 may be included in the first message 150, the second message 152, or both, of FIG. 1. For example, the group attribute 200 may be a field of the first message 150, the second message 152, or both, of FIG. 1. To illustrate, the group attribute may correspond to the group attribute(s) data 180 of FIG. 1. In some implementations, the group attribute 200 may be generated by and/or received by the first device 110, the second device 120, or the third device 130 of FIG. 1.

The group attribute 200 may include an attribute identifier (ID) field 202, a length field 204, an organizational unique identifier (OUI) field 206, a vendor attribute type field 208, a group key field 210, a group channel field 212, a group control field 214, a group identifier (ID) field 216, or a combination thereof. The attribute ID field 202, the length field 204, the vendor attribute type field 208, the group channel field 212, or a combination thereof, may each be 1 octet (e.g., 8 bits) long, as an illustrative, non-limiting example. The OUI field 206 may be 3 octets (e.g., 24 bits) long, as an illustrative, non-limiting example. The group key field 210 may be 4 octets (e.g., 32 bits) long, as an illustrative, non-limiting example. In some implementations, the group control field 214 may be 2 octets (e.g., 16 bits) long.

In some implementations, the group ID field 216 may have a variable length. For example, the group ID field 216 may be between 0 and 32 octets (e.g., 0 to 256 bits) long, as an illustrative, non-limiting example. A device that receives the group attribute 200 may determine a length of the group ID field 216 based on the length field 204 of a received message that includes the group attribute 200.

Referring to FIG. 1, the first device 110 may determine that the second message 152 includes the group attribute 200 based on the vendor attribute type field 208 having a particular value (e.g., 1), the attribute ID field 202 having a particular value (e.g., 221), the OUI field 206 having a particular value, or a combination thereof, as illustrative, non-limiting examples. The first device 110 may extract information regarding the data path group network from the second message 152 in response to determining that the second message 152 includes the group attribute 200. The first device 110 may determine an identifier of the data path group network of FIG. 1 based on a value of the group ID field 216. The first device 110 may determine the group key 124 based on a value of the group key field 210. For example, the value of the group key field 210 may correspond to a hash of the group key 124. In some implementations, the wireless network 101 may include multiple data path group networks, as described with reference to FIG. 4. For example, the wireless network 101 may include one data path group network for each service offered by a device of the wireless network 101. In such implementations, multiple data path group networks of the wireless network 101 may correspond to a single value of the group ID field 216. In this implementation, the first device 110 may distinguish between the multiple data path group networks based on the value of the group key field 210.

A device that receives the group attribute 200 may determine the group communication channel of the data path group network based on a value of the group channel field 212. The group control field 214 is further described with reference to FIG. 3. The group attribute 200 may enable use of a message to advertise availability of a service via a particular communication channel of the wireless network 101, via a group communication channel of the data path group network, or both.

Referring to FIG. 3, a diagram of an illustrative example of a group control field is shown and generally designated 214. In a particular implementation, the group control field 214 may be included in the group attribute 200 of FIG. 2. The group control field 214 may include a group transmission (TX) repeat field 302, a discovery window (DW) offset field 304, a group TX offset field 306, a group TX window size field 308, a group paging window size field 310, a group heartbeat field 312, a group lifetime field 314, or a combination thereof.

A value of the DW offset field 304 may indicate that a first group transmission window (e.g., a group time block) begins after a particular duration subsequent to an end (or a beginning) of a discovery window, such as a discovery window of the wireless network 101 of FIG. 1. A value of the group TX repeat field 302 may indicate whether group transmission windows (e.g., group time blocks) are repeated multiple times between consecutive discovery windows. A value of the group TX offset field 306 may indicate a particular duration between an end of a particular group transmission window and a beginning of a next group transmission window. A value of the group TX window size field 308 may indicate a size of each group transmission window, such as a time block window size. Each group transmission window includes a group paging window at a beginning of the group transmission window. A value of the group paging window size field 310 may indicate a particular duration of each group paging window. A value of the group heartbeat field 312 may indicate the heartbeat value 136, as described with reference to FIG. 1. A value of the group lifetime field 314 may indicate the lifetime value 134, as described with reference to FIG. 1.

FIG. 3 further includes an illustrative example of a transmission schedule 316. In some implementations, the transmission schedule 316 may correspond to a group communication channel of the data path group network described with reference to FIG. 1. On a transmit side, a device that sends the group attribute 200 may generate the group control field 214 to represent the transmission schedule 316 and may include the group control field 214 in a message, such as a discovery message. For example, the third device 130 may generate the group control field 214 to represent the transmission schedule 316 corresponding to a group communication channel 336 of the data path group network. The third device 130 may include the group control field 214 in the second message 152 and may transmit the second message 152 to advertise availability of a service provided via the group communication channel 336. On a receive side, a device that receives the group attribute 200 may determine the transmission schedule 316 of the group communication channel 336 based on the group control field 214.

In some implementations, the value of the DW offset field 304 may indicate a DW offset 324 of the transmission schedule 316. The DW offset 324 may be a particular duration between an end of a discovery window (e.g., a first discovery window 318 of the wireless network 101) and a beginning of a subsequent group transmission window of the group communication channel 336. The value of the group TX repeat field 302 may indicate that multiple group transmission windows, such as a group TX window 340, are repeated between consecutive discovery windows. The consecutive discovery windows may correspond to the first discovery window 318 and the second discovery window 320. In some implementations, the first discovery window 318 or the second discovery window 320 may correspond to the discovery window of the wireless network 101 described with reference to FIG. 1.

The value of the group TX offset field 306 may indicate a group TX offset 326 of the transmission schedule 316. The group TX offset 326 may be a particular duration between consecutive group transmission windows. The value of the group TX window size field 308 may indicate a group TX window size 328 of the transmission schedule 316. The group TX window size 328 may be a first size (e.g., duration) of each group transmission window (e.g., each group TX window 340). Each group TX window 340 may include a group paging window 342 and a group data window 344. The value of the group paging window size field 310 may indicate a group paging window size 330 of the transmission schedule 316. The group paging window size 330 may be a second size (e.g., duration) of each group paging window at a beginning of each group transmission window. In some implementations, there may be a time interval of approximately 512 milliseconds (ms) between consecutive discovery windows.

In some implementations, one or more frames (e.g., discovery frames) and/or synchronization beacons may be broadcast via a particular communication channel 372 of the wireless network 101. For example, a device may send a discovery frame during one or more discovery windows. To illustrate, the first device 110 may broadcast the discovery frame, such as the first message 150, during the first discovery window 318, the second discovery window 320, or both. The discovery frame may be received and used by a device that is not included in the wireless network 101 to discover the wireless network 101 (and/or the data path group network). Additionally, the discovery frame may enable the device to join the wireless network 101 (and/or the data path group network). A synchronization beacon may be used by multiple devices of the wireless network 101 for time synchronization function (TSF) correction. For example, the synchronization beacon may include a timestamp that is used to update timers, such as a TSF clock, of devices of the wireless network 101.

The group control field 214 may enable a device (e.g., the third device 130) to specify a transmission schedule 316 corresponding to the group communication channel 336. A receiving device (e.g., the first device 110 or the second device 120) may monitor the group communication channel 336 based on the transmission schedule 316 indicated by the group control field 214.

Figure 4:
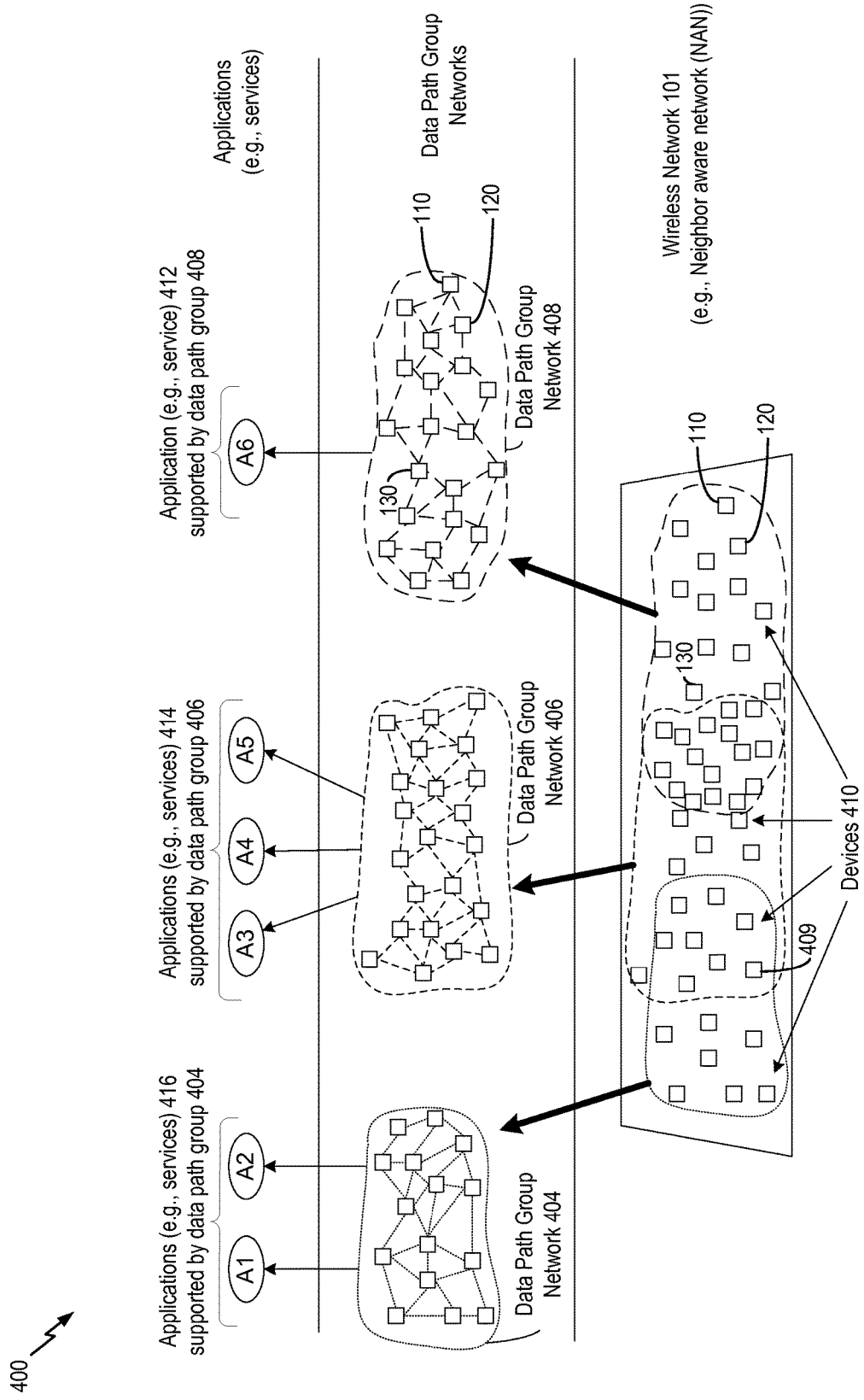
FIG. 4 is a diagram of an illustrative example of a system that includes a data path group network.

Referring to FIG. 4, a particular example of a system is shown and generally designated system 400. The system 400 may include the wireless network 101, such as a NAN (e.g., a NAN cluster). The system 400 may include multiple devices, such as representative devices 410. A particular device 409 and one or more of the devices 110, 120, 130 of FIG. 1 are also shown for ease of explanation.

Devices of the wireless network 101 may have clocks that are synchronized (e.g., by using beacons) to enable the devices to wake up periodically. For example, the devices may wake up by switching to an active mode during certain time periods, such as discovery windows of the wireless network 101. Each of the devices may monitor the same communication channel, such as the particular communication channel 372 of FIG. 3, during the time periods. The wireless network 101 may be identified by a network identifier (ID), such as a NAN cluster identifier (ID). The network ID may be selected by a device that initiates formation of the wireless network 101 and may be included in messages, such as discovery messages.

A subset of the devices of the wireless network 101 may transmit synchronization beacons over the particular communication channel corresponding to the wireless network 101. Discovery beacons, such as the first message 150 and the second message 152 of FIG. 1, and the synchronization beacons may be transmitted by one or more devices during the discovery windows. A discovery beacon may be received at a device that is not included in the wireless network 101. The discovery beacon may include information, such as the group attribute(s) data 180 of FIG. 1 and/or the group attribute 200 of FIG. 2 that enables the device to discover the wireless network 101 (and/or a particular data path group network). The information of the discovery beacon may also enable the device to join the wireless network 101 (and/or the particular data path group network). A synchronization beacon may be used by the devices of the wireless network 101 for time synchronization function (TSF) correction.

In some implementations, the wireless network 101 may have a tree structure anchored at a particular device (called an anchor master) of the wireless network 101. A timing of the anchor master may be propagated to each of the devices of the wireless network 101 via synchronization (synch) devices and master devices (e.g., NAN master devices). The synch devices and the master devices may provide time synchronization within the wireless network 101.

One or more data path group networks (e.g., a data path group network 404, a data path group network 406, and a data path group network 408) may be included in the wireless network 101. In some implementations, the data path group networks may correspond to distinct applications, distinct types of devices, distinct operating systems, or a combination thereof.

In a particular implementation, the data path group network as described with reference to FIG. 1 may correspond to the data path group network 408. For example, the data path group network 408 may include the devices 110, 120, 130 of FIG. 1. In other implementations, the data path group network as described with reference to FIG. 1 may correspond to the data path group network 404 or the data path group network 406. In some implementations, a device may be included in multiple data path group networks. To illustrate, the particular device 409 may be included in the data path group network 404 and in the data path group network 406.

In some implementations, the data path group network 404 may include a first subset of devices of the wireless network 101, the data path group network 406 may include a second subset of the devices, and the data path group network 408 may include a third subset of the devices. The subsets may overlap may overlap or may be distinct. One or more devices, such as the particular device 409, may join multiple data path group networks. To illustrate, the particular device 409 may be a provider device of a first service in a particular data path group network (e.g., the data path group network 404), may be a proxy device of a second service in another data path group network (e.g., the data path group network 406), may be a consumer device of the first service, the second service, and/or a third service in yet another data path group network (e.g., the data path group network 408), or a combination thereof.

A device participating in a particular data path group network may forward a received message, such as a received discovery message. For example, the first device 110 may generate and transmit the first message 150 in response to receiving the second message 152, as described with reference to FIG. 1. The device participating in the particular data path group network may also forward received data. For example, the first device 110 may receive the data 156 of FIG. 1 from the third device 130 and may forward the data 156 to the second device 120. The second device 120 may thus have multi-hop access to the data 156 provided by the third device 130.

In some implementations, a particular data path group network may correspond to a service or multiple services, such as a service supported by a single application or multiple services supported by multiple applications. For example, each of the data path group networks 404, 406, and 408 may correspond to one or more services. To illustrate, the data path group network 404 may correspond to a first set of services supported by a first set of applications 416, such as a first application (A1) and a second application (A2). The data path group network 406 may correspond to a second set of services supported by a second set of applications 414, such as a third application (A3), a fourth application (A4), and a fifth application (A5). The data path group network 408 may correspond to a third set of services supported by a third set of applications 412, such as a sixth application (A6). In a particular implementation, a service of the sixth application (A6) may correspond to a service provided by the third device 130 of FIG. 1.

A particular device (such as the third device 130) of the data path group network 408 may advertise availability of a service corresponding to the sixth application (A6). To advertise the service, the particular device may send a message, such as the second message 152, to one or more devices within communication range of the particular device. For example, the message may be sent during a time period, such as a discovery window, corresponding to the wireless network 101 and/or during a group paging window corresponding to the data path group network 408. The first device 110 may receive the second message 152 and may join the data path group network 408 in response to receiving the second message 152. As part of joining the data path group network 408, the first device 110 may receive a group key of the data path group network 408 from the third device 130. The first device 110 may set the lifetime counter 122, the heartbeat counter 126, or both, based on the second message 152, as described with reference to FIG. 1. The first device 110 may generate the first message 150 based on receiving the second message 152. The first device 110 may send the first message 150 to one or more devices (e.g., the second device 120) within communication range of the first device 110. For example, the first message 150 may be sent during a time period. To illustrate, the time period may correspond to a discovery window, corresponding to the wireless network 101, during a group paging window corresponding to the data path group network 408, or during another time period, such as during a group data window.

In response to receiving the first message 150, the second device 120 may join the data path group network 408 by associating with the first device 110. As part of joining the data path group network 408, the second device 120 may receive the group key, such as the group key 124, of the data path group network 408 from the first device 110. The group key 124 of data path group network 408 may be distinct from another group key of a different data path group network, such as one of the data path group networks 404 and 406.

After a device joins the data path group network 408, the device may monitor a group communication channel of the data path group network 406 during one or more group paging windows. While monitoring the group communication channel, the device may receive a traffic indication message (TIM) during a particular group paging window. For example, the TIM may be included in a broadcast message that is received by multiple devices of the data path group network 408. The TIM may be encrypted and each device of the data path group network 408 that receives the TIM may decrypt the TIM using the group key 124. Each device that decrypts the TIM may determine whether the TIM indicates that it is to receive data during a group data window (following the particular group paging window). If a device determines that the TIM indicates that it is to receive the data, the device may monitor the group communication channel during the group data window. In some implementations, one or more devices of the data path group network 408 may switch to sleep mode during the group data window in response to determining that the TIM does not indicate there is data to be received by the one or more devices.

In some implementations, the devices of the data path group network 404 and the data path group network 406 that are not included in the data path group network 408 may not have access to the group key 124 of the data path group network 408 and may be unable to decrypt the TIM. Thus, communication messages encrypted using a particular group key of a particular data path group network may be inaccessible to devices that are not included in the particular data path group network. To illustrate, communication message of the data path group network 408 may be encrypted using the group key of the data path group network 408 and may be inaccessible to devices that are not included in the data path group network 408.

As an illustrative example of operation of the data path group network 408, the first device 110 may receive data, such as the data 156, corresponding to the sixth application (A6) from the third device 130 during the group data window. The first device 110 may forward the data 156 to the one or more devices within communication range of the first device 110 during a subsequent group transmission window.

The system 400 may enable a provider device to provide messages, such as discovery messages, and/or data corresponding to a particular application to other devices in a same data path group network. Some devices of the data path group network may be outside a communication range of the provider device. The devices that are within the communication range of the provider device may forward the messages and/or the data to devices that are outside the communication range of the provider device. A device may thus have receive the messages and/or may have access to the data via the data path group network even if the device is multiple hops away from the provider device.

Figure 5:
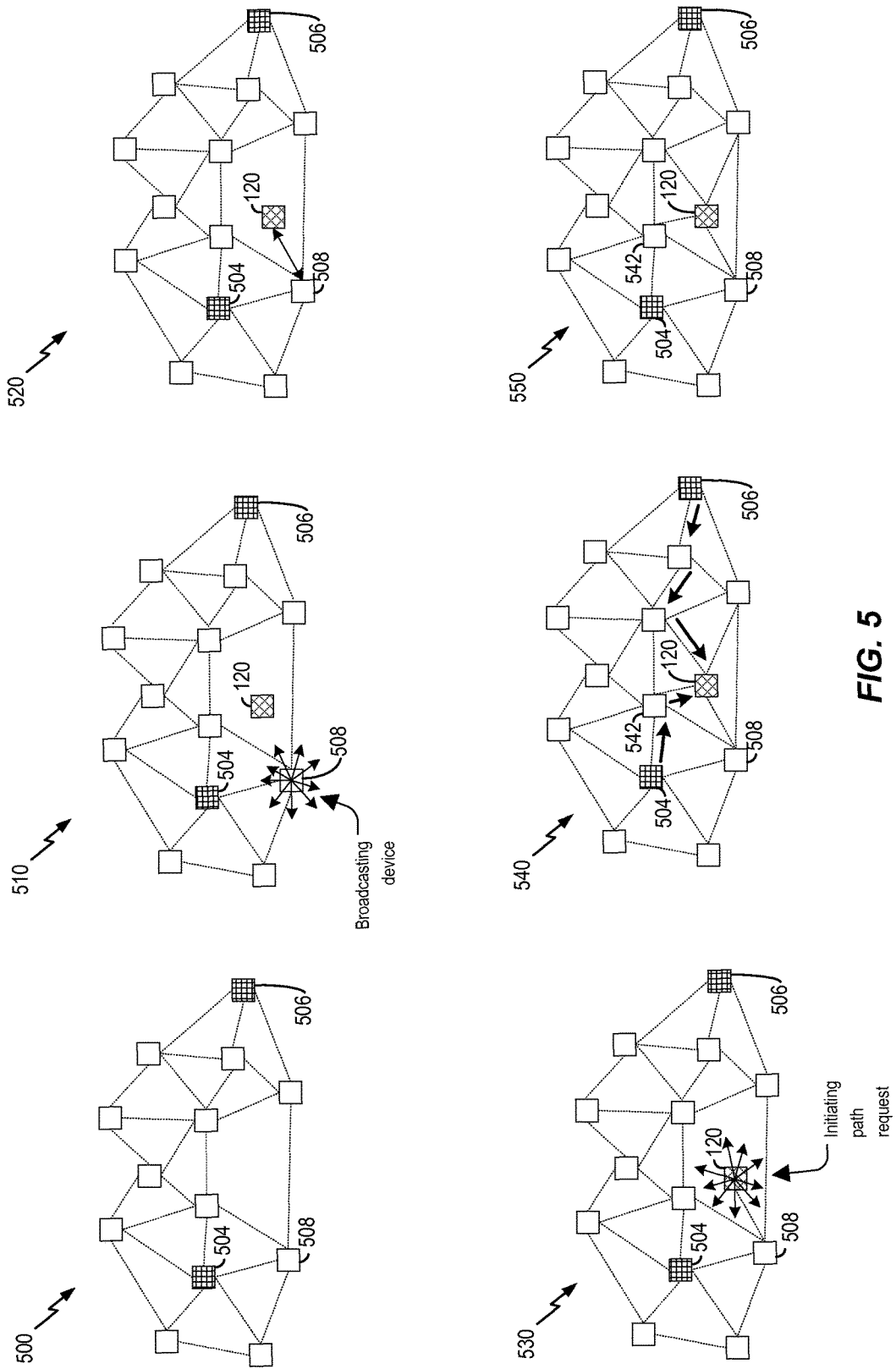
FIG. 5 is a diagram to illustrate states of a data path group network.

Referring to FIG. 5, states of a particular data path group network are shown. In some implementations, the states may correspond to the data path group network including the devices 110, 120, 130 described with reference to FIG. 1 or one of the data path group networks 404-408 of FIG. 4.

A plurality of devices, including one or more provider devices, may participate in a data path group network, at 500. The data path group network may include one or more provider devices, such as a first provider device 504 and a second provider device 506. The data path group network may also include a proxy device 508, such as the first device 110 of FIG. 1. The plurality of devices may be synchronized via beaconing on a particular communication channel of a wireless network that includes the data path group network. For example, the particular communication channel may correspond to the particular communication channel 372 of the wireless network 101. A beacon message may include or correspond to the second message 152 that is generated by the first provider device 504. To illustrate, the second message 152 may include the group control field 214 of FIGS. 2-3 which may specify the transmission schedule 316, as described with reference to FIG. 3.

The second device 120 may enter communication range of the proxy device 508 participating in the data path group network, at 510. The second device 120 may receive a service broadcast message from the proxy device 508 that is transmitted by the proxy device 508 to devices within communication range of the proxy device 508. For example, the service broadcast message may correspond to the first message 150 of FIG. 1. The service broadcast message may be a forwarded version of a second message received at the proxy device 508 from the first provider device 504. The service broadcast message may include information that advertises a service (provided by the first provider device 504 and/or the second provider device 506) that is available via the data path group network.

The second device 120 may join the data path group network in response to receiving the service broadcast message, at 520. For example, the second device 120 may authenticate with the proxy device 508. As part of or following authentication, the second device 120 may receive a group key of the data path group network from the proxy device 508. For example, in response to receiving the first message 150, the second device 120 may send the request 158 to the proxy device 508. Upon authentication, the second device 120 may receive the group key from the proxy device 508 and may set its the lifetime counter 122 to a first value based on the first message. Additionally or alternatively, the second device 120 may set its heartbeat counter 126 to a second value based on the first message.

The second device 120 may initiate route discovery to reach one or more provider devices, at 530. The route discovery may be used to identify a path from the second device 120 to the first provider device 504 and/or a second path to the second provider device 506. For example, the second device 120 may initiate route discovery to reach the first provider device 504 and/or the second provider device 506 by sending a path request (PREQ) message to devices of the data path group network that are within communication range of the second device 120. The PREQ message may include data that indicates the first provider device 504 and/or the second provider device 506. To illustrate, the data may indicate a device identifier and/or a media access control (MAC) address of the first provider device 504. The second device may encrypt the PREQ message using the group key of the data path group network. Responsive to the PREQ message, the second device 120 may receive path replies (PREPs) from one or more device of the data path group network. In some implementations, the second device 120 may receive encoded PREPs (encoded using the group key), and the second device 120 may decrypt the PREPs using the group key.

The second device 120 may establish a first content delivery path corresponding to the first provider device 504 and/or a second content delivery path corresponding to the second provider device 506, at 540. For example, to establish the first content delivery path corresponding to the first provider device 504, the second device 120 may associate with a particular device 542 that is along the first content delivery path. The first content delivery path may enable data, such as the data 156 of FIG. 1, to be provided from the first provider device 504, via one or more proxy devices, to the second device 120.

Group paging windows of the group communication channel 336 of the data path group network may be used to coordinate sleep times, at 550. For example, the group control field 214 of FIGS. 2-3 may specify a time and a duration of group paging windows of the group communication channel 336. The devices of the data path group network may not use the group communication channel 336 to send beacon messages, such as discovery messages, to coordinate sleep times. For example, the devices of the data path group network may coordinate sleep times based on the group control field 214. To illustrate, after joining the data path group network, a particular device may stay awake during the group paging windows specified by the group control field 214 to monitor the group communication channel 336 of the data path group network. If the particular device (such as the second device 120) does not receive a TIM during a particular group paging window or determines that the TIM does not indicate there is data to be sent to the particular device, the particular device may sleep through a subsequent group data window (or a remainder of a group transmission window that includes the particular group paging window) and may sleep until a next group paging window (or a next discovery window). Alternatively, the particular device may be in an active mode through group data window to transmit and/or receive data corresponding to a service of the data path group network.

In some implementations, routing messages (e.g., PREQ and PREP), authentication messages (e.g., the request 158), new group key announcements, explicit disassociation messages, or a combination thereof, may be sent during group paging windows since each device of the data path group network may be awake during the group paging windows. Additionally, each device of the data path group network may switch to (or remain in) a sleep mode during one or more group paging windows of the data path group network in response to determining that a corresponding lifetime counter 122, a corresponding heartbeat counter 126, or both, have expired.

The states of FIG. 5 may enable a particular device of a data path group network to conserve power by switching to (or remaining in) a low power mode, such as a sleep mode, through group data windows during which there is no data to be sent to or from the particular device. Alternatively, the states of FIG. 5 may enable the particular device be in an active mode through group data window to transmit and/or receive data corresponding to a service of the data path group network. The particular device may disassociate from the data path group network based on a heartbeat counter and/or a lifetime counter of the particular device without receiving or generating explicit disassociation messages.

Figure 6:
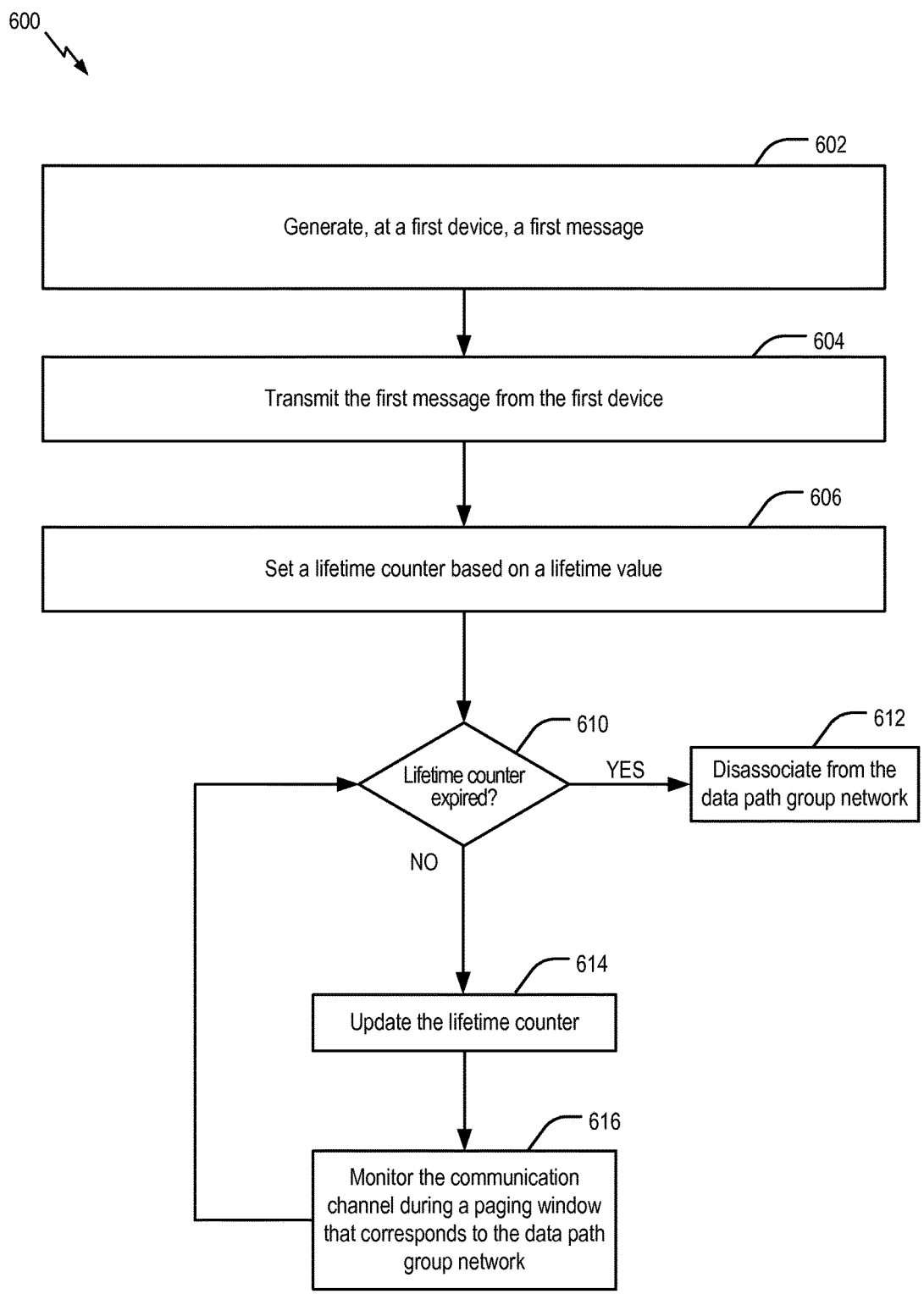
FIG. 6 is a flow chart to illustrate a method of operating a device of a data path group network.

Referring to FIG. 6, an illustrative example of a method of operating a device of a data path group network is shown and generally designated 600. The method 600 may be performed by a device, such as the first device 110, the second device 120, or the third device 130 of FIG. 1, one of devices of the data path group networks 404-408 of FIG. 4, or one of the devices of the data path group network of FIG. 5. For example, the method 600 may be performed by the group networking module 102 of one or more of the devices 110, 120, and 130 of FIG. 1.

The method 600 includes generating, at a first device, a first message, at 602. The first message may include data for indicating availability of a service of a data path group network, a lifetime value corresponding to the data path group network, a heartbeat value corresponding to the data path group network, and/or a group communication channel of the data path group network. For example, the data may include or correspond to the group attribute(s) data 180 of FIG. 1. In some implementations, the service may correspond to the application (A6) 412. The group communication channel may correspond to a value of the group channel field 212 of FIG. 2 or the group communication channel 336 of FIG. 3. The lifetime value may correspond to the lifetime value 134 of FIG. 1 or a value of the group lifetime field 314 of FIG. 3. The heartbeat value may correspond to the heartbeat value 136 of FIG. 1 or a value of the group heartbeat field 312 of FIG. 3. Referring to FIG. 1, the first device 110 of FIG. 1 may generate the first message 150. As another example, the third device 130 may generate the second message 152, as described with reference to FIG. 1.

The method 600 also includes transmitting the first message from the first device, at 604. The first message may be transmitted to a second device. The first device may use a transmitter, such as the transmitter 106 of FIG. 1, to transmit the first message to the second device that is within communication range of the first device. In some implementations, the first message may be transmitted during a discovery window. The discovery window may correspond to the first discovery window 318 or to the second discovery window 320 of FIG. 3. Referring to FIG. 1, the first device 110 may transmit the first message 150 during a discovery window. As another example, the third device 130 may transmit the second message 152 during a discovery window. In some implementations, the discovery window may include or correspond to a NAN discovery window.

The method 600 further includes setting a lifetime counter based on a lifetime value, at 606. For example, the lifetime counter may correspond to one of the lifetime counters 122 of FIG. 1. The lifetime value may be included in or indicated by the first message. Referring to FIG. 1, the first device 110 may set the lifetime counter 122 of the first device 110 based on the lifetime value 134. Additionally or alternatively, the first device 110 may set the heartbeat counter 126 of the first device 110 based on the heartbeat value 136.

The method 600 also includes determining whether the lifetime counter is expired, at 610. For example, the first device 110 may periodically determine whether the lifetime counter 122 of the first device 110 is expired. Additionally or alternatively, the first device 110 may periodically determine whether the heartbeat counter 126 of the first device 110 is expired. If the life counter is determined to be expired, the method 600 may advance to 612. Alternatively, if the life counter is determined to be unexpired, the method 600 may advance to 614.

The method 600 may include, in response to determining that the lifetime counter expired, disassociating from the data path group network, at 612. Referring to FIG. 1, the first device 110 may disassociate from the data path group network in response to determining that the lifetime counter 122 of the first device 110 is expired. In some implementations, the first device 110 may disassociate from the data path group network in response to determining that at least one of the lifetime counter 122 of the first device 110 and the heartbeat counter 126 of the first device 110 is expired. To disassociate from the data path group network, the first device 110 may implicitly disassociate from the data path group network without sending one or more explicit disassociation messages. In other implementations, the first device 110 may explicitly disassociate from the data path group network by broadcasting a disassociation message.

The method 600 further includes, in response to determining that the lifetime counter is unexpired, updating the lifetime counter, at 614. In some implementations, updating the lifetime counter may include decrementing the lifetime counter. Referring to FIG. 1, the first device 110 may update the lifetime counter 122 in response to determining that the lifetime counter 122 of the first device 110 is unexpired. Additionally or alternatively, the first device 110 may update the heartbeat counter 126 in response to determining that the heartbeat counter 126 of the first device 110 is unexpired.

The method 600 also includes monitoring the group communication channel of the data path group network during a group paging window that corresponds to the data path group network, at 616. For example, the first device 110 of FIG. 1 may monitor the group communication channel 336 during the group paging window. The method 600 may continue to 610.

The method 600 may enable a device to advertise (during the discovery window) availability of a service that corresponds to the data path group network. The method 600 may enable the device to disassociate from the data path group network in response to determining that a lifetime counter or a heartbeat counter is expired. The device may implicitly disassociate from the data path group network without sending an explicit disassociation message. The method 600 may thus reduce a communication overhead of disassociating from the data path group network.

Figure 7:
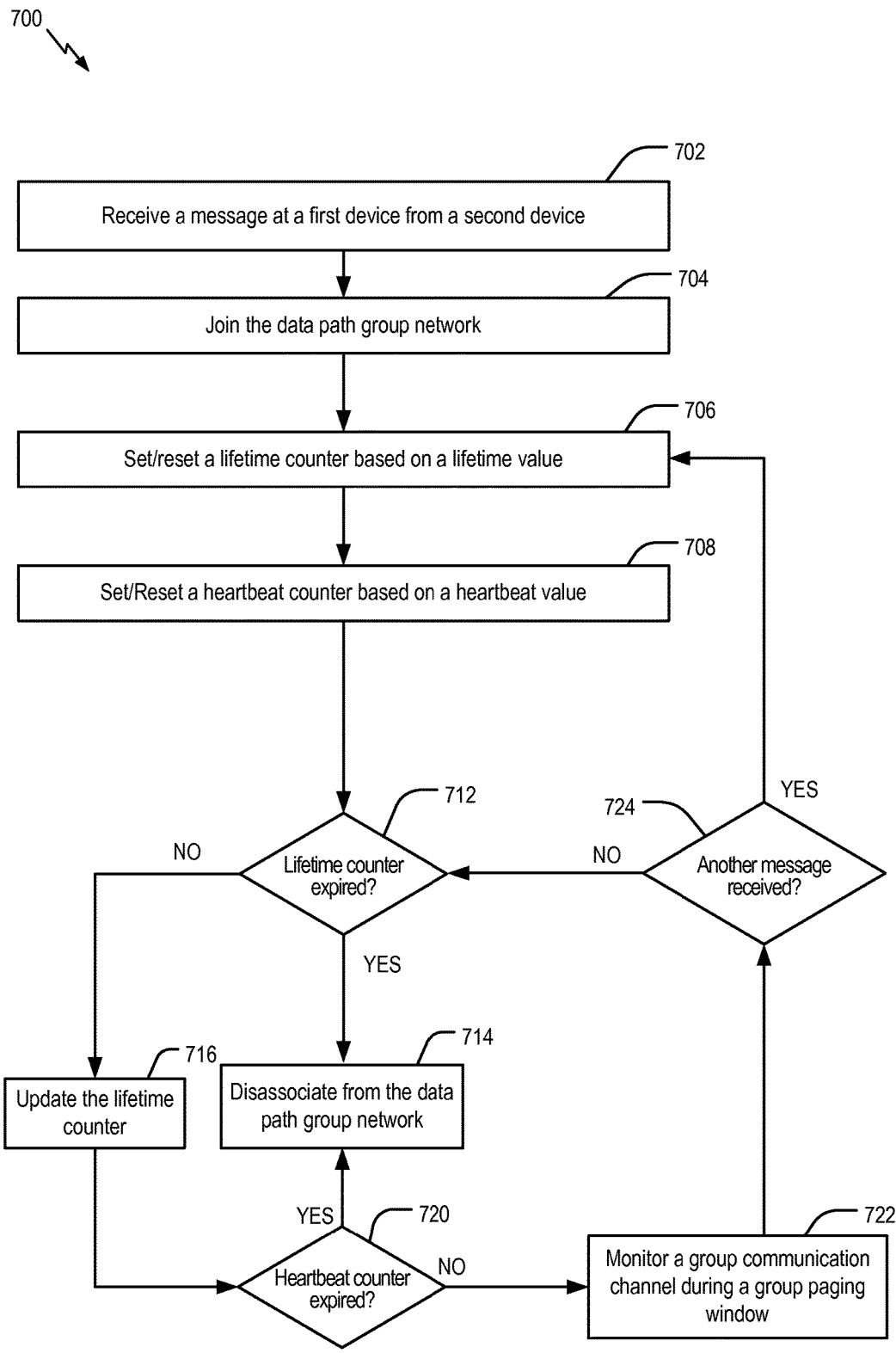
FIG. 7 is a flow chart to illustrate another method of operating a device of a data path group network.

Referring to FIG. 7, another illustrative example of a method of operating a device of a data path group network is shown and generally designated 700. The method 700 may be performed by a device, such as the first device 110, the second device 120, or the third device 130 of FIG. 1, one of devices of the data path group networks 404-408 of FIG. 4, or one of the devices of the data path group network of FIG. 5. For example, the method 700 may be performed by the group networking module 102 of one or more of the devices 110, 120, and 130 of FIG. 1.

The method 700 includes receiving a message at a first device from a second device, at 702. For example, the message may correspond to the first message 150 or the second message 152 of FIG. 1. The message may indicate availability of a service corresponding to a data path group network, a lifetime value of the data path group network, a heartbeat value of the data path group network, and a group communication channel corresponding to the data path group network. The message may include the group attribute(s) data 180 of FIG. 1 and/or the group attribute 200 of FIG. 2. The service may correspond to the application (A6) 412. The group communication channel may correspond to a value of the group channel field 212 of FIG. 2 or the group communication channel 336 of FIG. 3. The lifetime value may correspond to the lifetime value 134 of FIG. 1 or a value of the group lifetime field 314 of FIG. 3. The heartbeat value may correspond to the heartbeat value 136 of FIG. 1 or a value of the group heartbeat field 312 of FIG. 3. Referring to FIG. 1, the second device 120 may receive the first message 150 from the first device 110.

In some implementations, the second device 120 may determine the group communication channel 336 based on a value of the group channel field 212 of the group attribute 200. The group attribute 200 may include the group control field 214. The second device 120 may determine the lifetime value 134 based on a value of the group lifetime field 314, as described with reference to FIG. 3. The second device 120 may determine the heartbeat value 136 based on a value of the group heartbeat field 312, as described with reference to FIG. 3.

As another example, the first device 110 may receive the second message 152 from the third device 130, as described with reference to FIG. 1. The second message 152 may indicate availability of the service of the data path group network and the group communication channel 336, as described with reference to FIG. 1. The second message 152 may indicate the lifetime value 134, the heartbeat value 136, or both.

The method 700 also includes joining the data path group network, at 704. Referring to FIG. 1, the second device 120 may join the data path group network in response to receiving the first message 150. As another example, the first device 110 may join the data path group network in response to receiving the second message 152.

The method 700 also includes setting (or resetting) a lifetime counter based on the lifetime value, at 706. The lifetime counter may correspond to the lifetime counter 122 of FIG. 1. Referring to FIG. 1, the second device 120 may set the lifetime counter 122 of the second device 120 based on the lifetime value 134 in response to receiving the first message 150. In some implementations, the second device 120 may receive multiple messages. The multiple messages may include different lifetime values, and the second device 120 may set the lifetime counter 122 of the second device 120 based on a highest lifetime value (e.g., longest duration) of the lifetime values. The second device 120 may set the lifetime counter 122 of the second device 120 based on a default lifetime value, the lifetime value 134, or both. For example, the second device 120 may set the lifetime counter 122 of the second device 120 based on the group lifetime field 314 of the group attribute 200 of the first message 150.

The method 700 further includes setting (or resetting) the heartbeat counter based on the heartbeat value, at 708. The heartbeat counter may correspond to the heartbeat counter 126 of FIG. 1. Referring to FIG. 2, the second device 120 may set the heartbeat counter 126 of the second device 120 in response to receiving a message, such as the first message 150, the second message 152, or another message. In some implementations, the second device 120 may set the heartbeat counter 126 of the second device 120 based on a default heartbeat value, the heartbeat value 136 included in the first message 150, or both. For example, the second device 120 may set the heartbeat counter 126 of the second device 120 based on the group heartbeat field 312 of the group attribute 200 of the first message 150.

The method 700 also includes determining whether the lifetime counter has expired, at 712. Referring to FIG. 1, the second device 120 may determine whether the lifetime counter 122 of the second device 120 is expired. If the lifetime counter is expired, the method 700 may include disassociating from the data path group network, at 714. Referring to FIG. 1, the second device 120 may disassociate from the data path group network in response to determining that the lifetime counter 122 of the second device 120 is expired. If the lifetime counter is unexpired, the method 700 may include updating the lifetime counter, at 716. Updating the lifetime counter may include decrementing the lifetime counter. Referring to FIG. 1, the second device 120 of FIG. 1 may update the lifetime counter 122 of the second device 120 in response to determining that the lifetime counter 122 is unexpired.

The method 700 further includes determining whether the heartbeat counter is expired, at 720. Referring to FIG. 1, the second device 120 may determine whether the heartbeat counter 126 of the second device 120 is expired. If the heartbeat counter is determined to be expired, the method 700 may continue to 714. For example, the second device 120 may disassociate from the data path group network in response to determining that the heartbeat counter 126 of the second device 120 is expired. Alternatively, if the heartbeat counter is determined to be unexpired, the method 700 may include monitoring the group communication channel during a group paging window, at 722. Referring to FIG. 1, the group communication channel may be monitored by the second device 120 in response to determining by the second device 120 that the heartbeat counter 126 of the second device is unexpired. Monitoring the group communication channel during a group paging window, at 722, is described further with reference to FIG. 8.

The method 700 further includes determining whether another message has been received, at 724. Referring to FIG. 1, the second device 120 may determine whether another message, such as a discovery message, that corresponds to the service has been received. For example, another message may be received from at the second device 120 from the first device 110 and/or received from a device of the data path group network other than the first device 110. If another message has not been received, the method 700 may advance to 712. For example, referring to FIG. 1, the second device 120 may determine whether the lifetime counter 122 of the second device 120 is expired in response to determining that another message has not been received. Alternatively, if another message has been received, the method 700 may proceed to 708. For example, the second device 120 may set (or reset) the lifetime counter 122 of the second device 120 in response to determining that another message has been received.

The method 700 may enable a device to receive a message, such as a discovery message, advertising an availability of a service corresponding to the data path group network. The method 700 may enable the device to join a data path group network in response to receiving the message. The method 700 may enable the device to disassociate from a data path group network in response to determining that at least one of a lifetime counter and a heartbeat counter is expired. The device may implicitly disassociate from the data path group network without sending explicit disassociation messages. The method 700 may thus reduce a communication overhead of disassociating from a data path group network.

Figure 8:
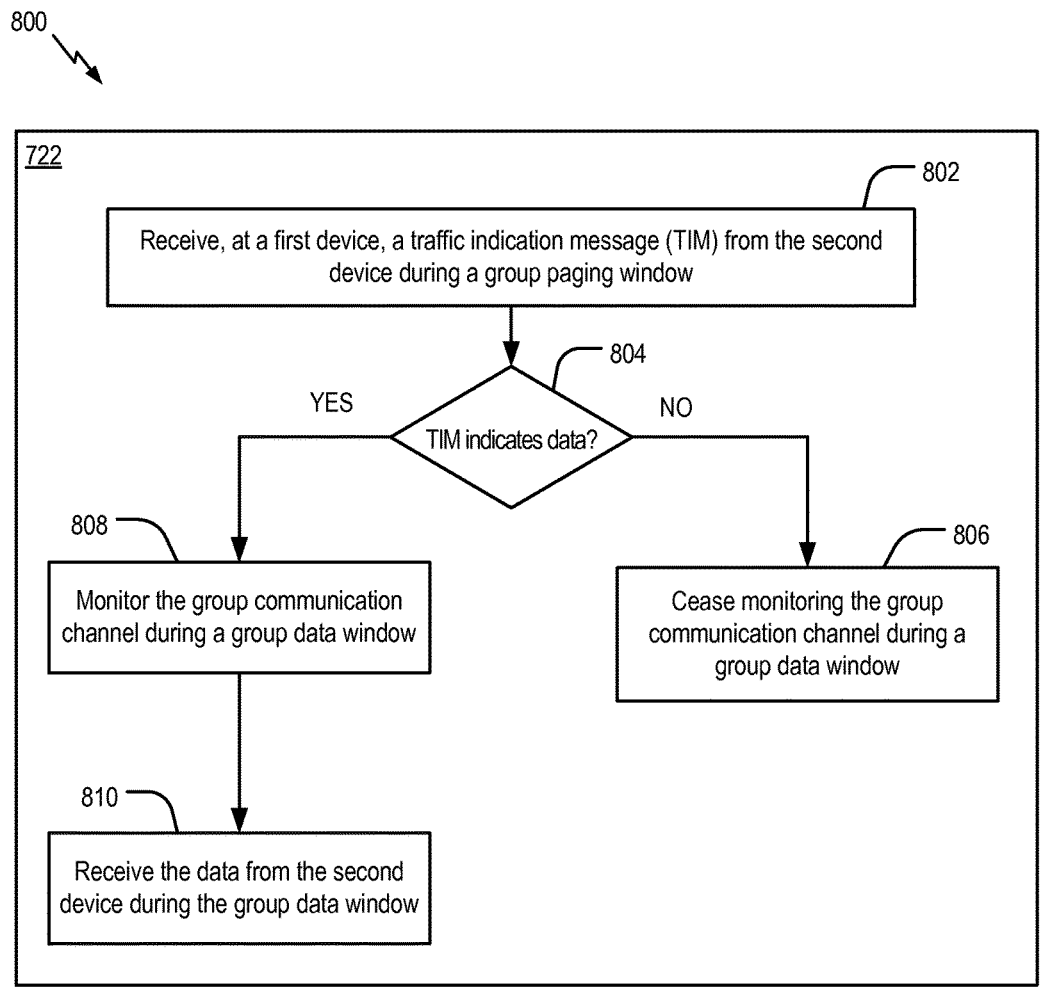
FIG. 8 is a flow chart to illustrate another method of monitoring a group communication channel of a data path group network.

Referring to FIG. 8, an illustrative example of a method of monitoring a group communication channel is shown and generally designated 800. The method 800 may be performed as part of monitoring the group communication channel, at 722 of FIG. 7. For example, the method 800 may be implemented to monitor a group communication channel of a data path group network during at least a portion of a group transmission window corresponding to the data path group network. The method 800 may be performed by a device, such as the first device 110, the second device 120, or the third device 130 of FIG. 1, one of devices of the data path group networks 404-408 of FIG. 4, or one of the devices of the data path group network of FIG. 5. For example, the method 800 may be performed by the group networking module 102 of one or more of the devices 110, 120, and 130 of FIG. 1.

The method 800 includes receiving, at a first device, a traffic indication message (TIM) from the second device during a group paging window, at 802. The TIM may correspond to the TIM 154 of FIG. 1. Referring to FIG. 1, the second device 120 may receive the TIM 154 from the first device 110 during a group paging window that corresponds to the data path group network. The second device 120 may decrypt the TIM 154 using the group key 124. In some implementations, subsequent to joining the data path group network, the second device 120 may receive a first association identifier from the first device 110. A first bit of the TIM 154 may correspond to the first association identifier. The second device 120 may determine that the first device 110 has data to send to the second device 120 based on determining that the first bit has a first value, such as a value equal to 1. In some implementations, a particular value of one or more bits of the TIM 154 may indicate that the second device 120 has data to broadcast to devices of the data path group network.

The method 800 also includes determining whether the TIM indicates data to be sent to the first device, at 804. Referring to FIG. 1, the second device 120 may determine whether the TIM 154 indicates that the first device 110 has data to send to the second device 120. For example, the second device 120 may determine that the TIM 154 indicates that the first device 110 does not have data to send to the second device 120 based on determining that the first bit of the first association identifier has a second value, such as a value equal to 0, and that the one or more bits of broadcast data do not correspond to the particular value.

If the TIM does not indicate data to be sent to the first device, the method 800 may include ceasing to monitor a group communication channel (of the data path group network) during a group data window (or a remaining portion of a group transmission window that includes the group paging window and the group data window), at 806. For example, the second device 120 may, in response to determining that the TIM 154 indicates that the first device 110 does not have data to send to the second device 120, may stop monitoring the group communication channel.

Alternatively, if the TIM indicates data to be sent to the first device, the method 800 may include monitoring the group communication channel (of the data path group network) during the group paging window, at 808. For example, the second device 120 may, in response to determining that the TIM 154 indicates that the first device 110 has data to send to the second device 120, monitor the group communication channel during the group data window (or the remaining portion of the group transmission window).

The method 800 further includes receiving the data from the second device during the group data window, at 810. Referring to FIG. 1, the second device 120 may receive the data 156 from the first device 110 during the group data window.

The method 800 may enable a first device to selectively monitor a group communication channel during group transmission windows based on whether a second device has data to send to the first device. The first device may switch to (or remain in) a sleep mode during a group transmission window in response to determining that the second device does not have data to send to the first device. The method 800 may thus reduce power consumption of devices during a group transmission window in which there is no data to be sent or received by the devices.

Figure 9:
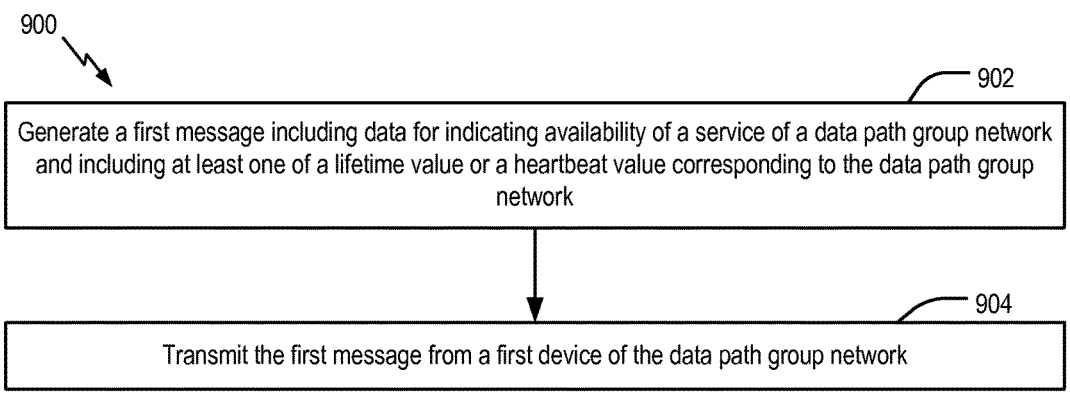
FIG. 9 is a flow chart to illustrate another method of operating a device of a data path group network.

Referring to FIG. 9, another an illustrative example of a method of operating a device of a data path group network is shown and generally designated 900. The method 900 may be performed by a device, such as the first device 110, the second device 120, or the third device 130 of FIG. 1, one of devices of the data path group networks 404-408 of FIG. 4, or one of the devices of the data path group network of FIG. 5. For example, the method 900 may be performed by the group networking module 102 of one or more of the devices 110, 120, and 130 of FIG. 1.

The method 900 includes, at 902, generating a first message including data for indicating availability of a service of a data path group network. The first message also includes at least one of a lifetime value or a heartbeat value corresponding to the data path group network. The data path group network may include an infrastructure-less, peer-to-peer network. In some implementations, the data path group network may include multiple devices of a neighborhood-aware network (NAN), such as the wireless network 101 of FIG. 1, which forms data connectivity amongst the multiple devices. The first message may correspond to the first message 150 of FIG. 1. In some implementations, the data may indicate a group communication channel of the data path group network. The lifetime value may correspond to the lifetime value 134 of FIG. 1 or data included in the group lifetime field 314 of FIG. 3. The heartbeat value may correspond to the heartbeat value 136 of FIG. 1 or data included in the group heartbeat field 312 of FIG. 3. The service may include at least one of audio streaming and video streaming, as illustrative, non-limiting examples. For example, the service may correspond to a service provided by one of the devices 110, 120, 130 of FIG. 1.

The method 900 also includes transmitting the first message from first device of the data path group network, at 904. The first message may be transmitted from the first device to a second device that is within communication range of the first device. In some implementations, the first message may be transmitted during a discovery window. For example, the discovery window may correspond to the first discovery window 318 or the second discovery window 320 of FIG. 3. To illustrate, the first message may be a service discovery message. The first device and/or the second device may be included in a neighborhood-aware network (NAN) that includes the data path group network. In some implementations, the first message may be transmitted by broadcasting the first message to a plurality of devices that includes the second device.

In some other implementations, the data for indicating availability of the service may be included in a group attribute field of the message. For example, the group attribute field may correspond to the group attribute 200. Additionally or alternatively, the message may indicate a transmission schedule corresponding to a group communication channel (e.g., the group communication channel 336 of FIG. 3) of the data path group network. For example, the transmission schedule may indicate a discovery window offset (e.g., the DW offset 324), a size of a group transmission window (e.g., the group TX window size 328), a size of a group paging window (e.g., the group paging window size 330), a number of consecutive group transmission windows between a pair of consecutive discovery windows, an offset between a pair of consecutive group transmission windows (e.g., the group TX offset 326), or a combination thereof. Additionally or alternatively, the message may include a hop count to a provider device of the service corresponding to the data path group network, a media access control (MAC) address of the provider device, a device identifier (ID) of the provider device, a MAC address of the first device, a device ID of the provider device, or a combination thereof.

In some implementations, the method 900 may include, prior to generating the first message, receiving a second message from a third device of the data path group network. For example, the second message may correspond to the second message 152 of FIG. 1. The second message may include second data that indicates at least one of the lifetime value or the heartbeat value. In response to receiving the second message and prior to transmitting the first message, the first device may join the data path group network and may set a lifetime counter of the first device, a heartbeat counter of the first device, or both. For example, the lifetime counter and the heartbeat counter may correspond to the lifetime counter 122 and the heartbeat counter 126, respectively, of FIG. 1. In some implementations, the first device may generate the first message in response to receiving the second message. The first message is transmitted via a second communication channel (e.g., the particular communication channel 372) that is distinct from the group communication channel (e.g., the group communication channel 336) of the data path group network.

If the second data indicates the lifetime value, the first device may set the lifetime counter based on the lifetime value and may periodically determine whether the lifetime counter is expired. In response to determining that the lifetime counter is unexpired, the first device may update the lifetime counter. Additionally or alternatively, in response to determining that the lifetime counter is unexpired, the method 900 may include monitoring the group communication channel of the data path group network during a group paging window.

In some implementations, the method 900 may include receiving a traffic indication message from the third device during the first group paging window of a group transmission window corresponding to the data path group network. The first group transmission window may include the group paging window and a group data window. The traffic indication message may be encrypted using a group key of the data path group network. In response to determining that the traffic indication message indicates that the third device has service data to send to the first device, the first device may monitor the group communication channel of the data path group network during the group data window of the group transmission window. The service data may correspond to the service and the first device may receive the service data from the third device during the group data window.

The first device may disassociate from the data path group network prior to expiration of the lifetime counter by transmitting a disassociation message to the third device of the data path group network. Additionally or alternatively, the first device may cease maintaining a memory allocation corresponding to the data path group network from a memory of the first device. The memory allocation may include a device list identifying a plurality of devices included in the data path group network, a group key of the data path group network, the lifetime counter, a heartbeat counter of the first device, or a combination thereof. For example, the first device may have generated and maintained the memory allocation as part of and after joining the data path group network.

If the second data indicates the heartbeat value, the method 900 may include setting the heartbeat counter of the first device. The first device may periodically determine whether the heartbeat counter is expired and, in response to determining that the heartbeat counter is unexpired, the first device may update the heartbeat counter. In some implementations, the first device may disassociate from the data path group network in response to determining that the heartbeat counter is expired. In other implementations, the first device may disassociate from the data path group network prior to expiration of the heartbeat counter by transmitting a disassociation message to the third device of the data path group network. Additionally or alternatively, the first device may disassociate from the data path group network by removing a memory allocation corresponding to the data path group network from a memory of the first device.

In some implementations, prior to generating the first message, the method 900 may include receiving multiple messages from a plurality of devices included in the data path group network. Each of the received multiple messages may include lifetime data indicating a corresponding lifetime value. In some implementations, the first device may determine a highest received lifetime value corresponding to the multiple messages. The first device may determine the lifetime value to be indicated by the data of the first message based on the highest received lifetime value. For example, the first device may select the highest received lifetime value of the received multiple message to be included in the first message as the lifetime value.

In some implementations, prior to generating the first message, the first device may join the data path group network and, subsequent to joining the data path group network, may monitor the group communication channel of the data path group network during group paging windows corresponding to the data path group network. For example, the first device may monitor the group communication channel of the data path group network in response to determining that a lifetime counter and a heartbeat counter of the first device are unexpired. To monitor the group communication channel of the data path group network, the first device may switch to an active mode to monitor the group communication channel of the data path group network during a first group paging window that corresponds to the data path group network.

In some implementations, the first device may disassociated from the data path group network in response to determining that at least one of a lifetime counter and a heartbeat counter of the first device is expired. After disassociating from the data path group network, the first device may cease monitoring the group communication channel during group paging windows of the data path group network. For example, the first device may switch to a sleep mode during a second group paging window that corresponds to the data path group network. The sleep mode may be a lower power mode than the active mode. As another example, after disassociating from the data path group network, the first device may disregard a second group paging window that corresponds to the data path group network. For example, the first device may perform an operation other than monitoring the second group paging window. To illustrate, the first device may refrain from waking up (and/or remain idle) during the second group paging window or, if the first device is active during the second group paging window, may not monitor the group communication channel of the data path group network during the second group paging window.

In some implementations, the first device may be a provider device of the service, and the method 900 may include setting, based on the lifetime value, a lifetime counter of the first device to correspond to a first end time of the data path group network. The first device may subsequently determine a second lifetime value to extend a lifetime of the data path group network. For example, the second lifetime value may correspond to a second end time that is subsequent to the first end time. The first device may transmit the second lifetime value to the second device and may set the lifetime counter to correspond to the second end time based on the second lifetime value.

Additionally or alternatively, after setting the lifetime counter based on the lifetime value and prior to expiration of the lifetime counter, the method 900 may include determining service data is to be communicated from the first device to one or more devices of the data path group network and providing the service data to the one or more devices prior to expiration of the lifetime counter. If an entirety of the service data is provided to the one or more devices prior to expiration of the lifetime counter, the first device may refrain from extending a lifetime of the data path group network and may disassociate from the data path group network in response to expiration of the lifetime counter.

In some implementations, the method 900 may include setting, based on the lifetime value, a lifetime counter of the first device to correspond to a first end time of the data path group network. After setting the lifetime counter (based on the lifetime value), the first device may receive a third message from a third device of data path group network, the third message including update data indicating a second lifetime value, an update action, or both. The update action may include or correspond to, but is not limited to, changing a group key of the data path group network, changing a group communication channel of the data path group network, changing a transmission schedule of the data path group network, changing a network identifier corresponding to the data path group network, changing a neighborhood-aware network (NAN) cluster corresponding to the data path group network, or a combination thereof. In response to detecting expiration of the lifetime counter (that is set according to the lifetime value), the first device may set, based on the second lifetime value, the lifetime counter to correspond to a second end time of the data path group network. Additionally, the method 900 may include executing the update action.

The method 900 may enable a device to advertise availability of a service via the group communication channel. The method 900 may enable the device to disassociate from the data path group network in response to determining that the lifetime counter (or the heartbeat counter) is expired. The device may implicitly disassociate from the data path group network without sending explicit disassociation messages. The method 900 may thus reduce a communication overhead related to disassociating from the data path group network.

In particular aspects, the methods of FIGS. 6-9 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, one or more of the methods of FIGS. 6-9, individually or in combination, may be performed by a processor that executes instructions, as described with respect to FIG. 10. To illustrate, a portion of one of the methods FIGS. 6-9 may be combined with a second portion of one of the methods of FIGS. 6-9. Additionally, one or more steps described with reference to the FIGS. 6-9, may be optional, may be performed at least partially concurrently, and/or may be performed in a different order than shown or described.

Figure 10:
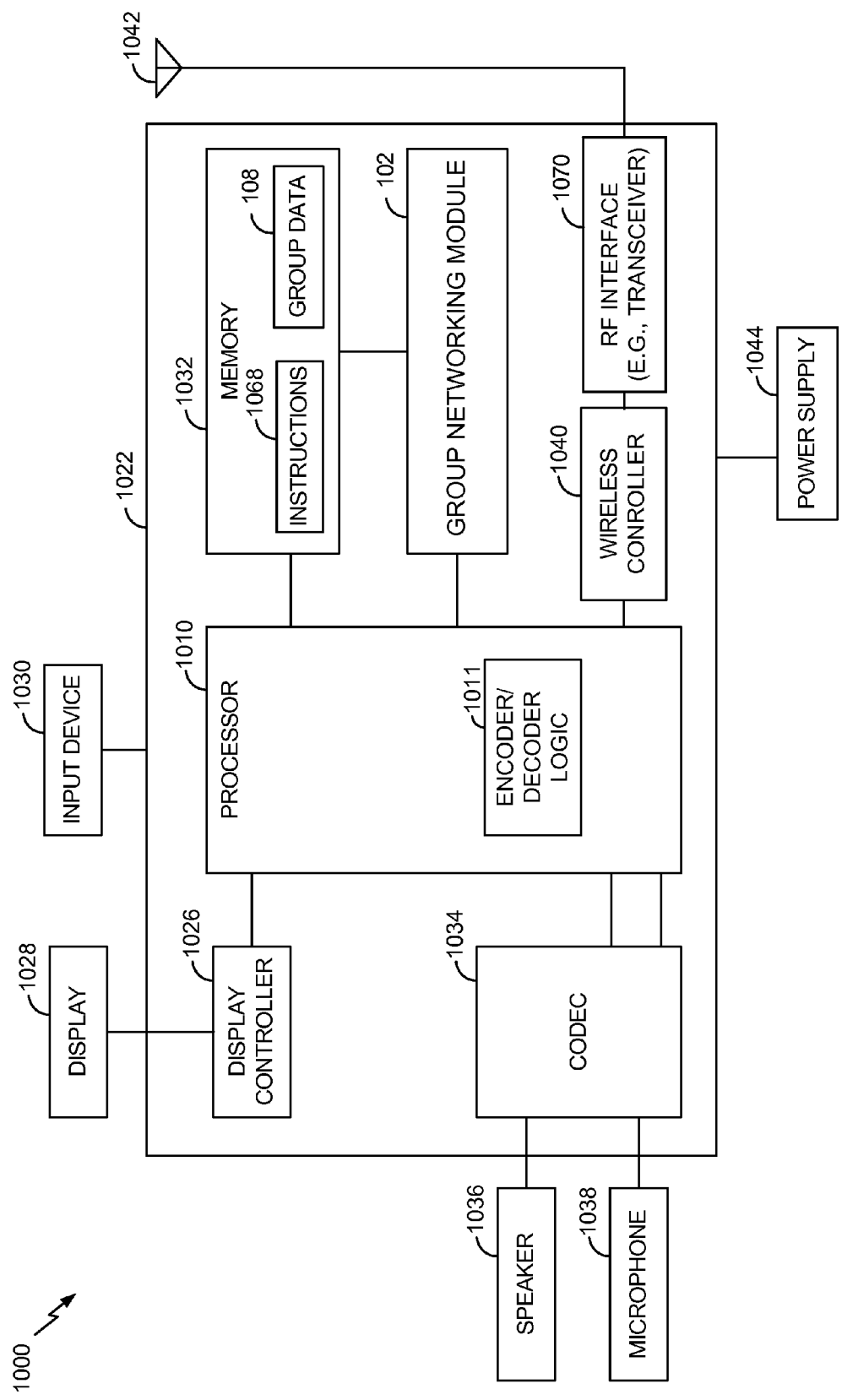
FIG. 10 is a block diagram of a device operable to perform wireless network communication in accordance with the systems and methods of FIGS. 1-9.

Referring to FIG. 10, a block diagram of an illustrative example of a wireless communication device is depicted and generally designated 1000. The wireless communication device 1000 may correspond to the first device 110, the second device 120, or the third device 130 of FIG. 1, one of devices of the data path group networks 404-408 of FIG. 4, or one of the devices of the data path group network of FIG. 5.

The device 1000 includes a processor 1010 (e.g., a digital signal processor (DSP) or a central processing unit (CPU)) coupled to a memory 1032. The memory 1032 may include instructions 1068 and the group data 108. The group data 108 may include the group key 124, the counter(s) 121, such as the lifetime counter 122 and/or the heartbeat counter 126, or a combination thereof. The processor 1010 may include encoder/decoder logic 1011. The encoder/decoder logic 1011 may be configured to encode and/or decode data, such as messages received by the device 1000 and/or messages to be transmitted by the device 1000. The processor 1010 may be coupled to, or may include, the group networking module 102. In some implementations, the group networking module 102 may operate according to the method 600 of FIG. 6, the method 700 of FIG. 7, the method 800 of FIG. 8, the method 900 of FIG. 9, or a combination thereof. Although the encoder/decoder logic 1011 is illustrated as being separate from the group networking module 102, in other implementations, the encoder/decoder logic 1011 may be included in the group networking module 102.

The group networking module 102 may generate a message (e.g., the first message 150 and/or the second message 152 of FIG. 1), may receive a message (e.g., the first message 150 and/or the second message 152 of FIG. 1), may join a data path group network, may receive and forward data (e.g., the data 156), may explicitly or implicitly disassociate from the data path group network, or a combination thereof.

In a particular implementation, the group networking module 102 may be implemented on-chip, such as via the processor 1010. For example, the memory 1032 may be a computer-readable storage device (e.g., a non-transitory computer-readable medium) that includes computer-executable instructions 1068 that are executable by the processor 1010 to cause the processor 1010 to perform operations of the group networking module 102. For example, the processor 1010 may generate a message (e.g., the first message 150 and/or the second message 152 of FIG. 1), may receive a message (e.g., the first message 150 and/or the second message 152 of FIG. 1), may join a data path group network, may receive and/or send data (e.g., the data 156), may explicitly or implicitly disassociate from the data path group network, or a combination thereof.

In a particular implementation, the computer-executable instructions 1068, when executed by the processor 1010, may cause the processor 1010 to perform operations including generating a first message that includes data that indicates availability of a service via a data path group network and that indicates a lifetime value, a heartbeat value, or both, corresponding to the data path group network. Additionally, the computer-executable instructions 1068, when executed by the processor 1010, may further cause the processor 1010 to perform operations including initiating wireless transmission of the first message from a first device to a second device.

FIG. 10 also shows a display controller 1026 that is coupled to the processor 1010 and to a display 1028. A coder/decoder (CODEC) 1034 can also be coupled to the processor 1010. A speaker 1036 and a microphone 1038 can be coupled to the CODEC 1034.

FIG. 10 also indicates that a wireless controller 1040 can be coupled to the processor 1010 and, via a radio frequency (RF) interface 1070, to an antenna 1042. The RF interface 1070 (e.g., a transceiver) may include the receiver 104, the transmitter 106, or both, of FIG. 1. In some implementations, the processor 1010, the group networking module 102, the display controller 1026, the memory 1032, the CODEC 1034, and the wireless controller 1040 are included in a system-in-package or system-on-chip device 1022. Additionally or alternatively, an input device 1030 and a power supply 1044 may be coupled to the system-on-chip device 1022. Moreover, in some implementations, as illustrated in FIG. 10, the display 1028, the input device 1030, the speaker 1036, the microphone 1038, the antenna 1042, and the power supply 1044 are external to the system-on-chip device 1022. However, each of the display 1028, the input device 1030, the speaker 1036, the microphone 1038, the antenna 1042, and the power supply 1044 can be coupled to a component of the system-on-chip device 1022, such as an interface or a controller. In some implementations, the encoder/decoder logic 1011 and/or the group networking module 102 may be included in the wireless controller 1040.

In conjunction with one or more of the described aspects of FIGS. 1-10, an apparatus is disclosed that may include means for generating a first message that includes data that indicates availability of a service via a data path group network and that indicates a lifetime value, a heartbeat value, or both, corresponding to the data path group network. The means for generating may include or correspond to the group networking module 102 of FIG. 1, the wireless controller 1040, the RF interface 1070, the processor 1010 programmed to execute the instructions 1068 of FIG. 10, one or more other structures, components, and/or circuits configured to generate the first message, or any combination thereof.

The apparatus may also include means for transmitting the first message from a first device to a second device. The means for transmitting may include or correspond to the transmitter 106 of FIG. 1, the wireless controller 1040, the RF interface 1070, the antenna 1042, the processor 1010 programmed to execute the instructions 1068 of FIG. 10, a transceiver (e.g., a transmitter and/or a receiver), one or more other structures, components, and/or circuits configured to transmit the first message, or any combination thereof.

The apparatus may also include means for receiving a second message from a third device. The second message may include second data that indicates the lifetime value, the heartbeat value, or both. The first message may be generated in response to the second message. The means for receiving may include or correspond to the group networking module 102, the receiver 104 of FIG. 1, the wireless controller 1040, the RF interface 1070, the antenna 1042, the processor 1010 programmed to execute the instructions 1068 of FIG. 10, a transceiver, one or more other structures, components, and/or circuits configured to receive the second message, or any combination thereof.

The apparatus may also include means for storing the lifetime value, the heartbeat value, or both. The means for storing may include or correspond to the group networking module 102, the group data 108, the lifetime counter 122, the heartbeat counter 126 of FIG. 1, the memory 1032, the wireless controller 1040, the processor 1010 programmed to execute the instructions 1068 of FIG. 10, one or more other structures, components, and/or circuits configured to store the lifetime value and/or the heartbeat value, or any combination thereof.

One or more of the disclosed aspects may be implemented in a system or an apparatus, such as the device 1000, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1000 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-10 may illustrate systems, apparatuses, and/or methods according to the teachings of the disclosure, the disclosure is not limited to these illustrated systems, apparatuses, and/or methods. One or more functions or components of any of FIGS. 1-10 as illustrated or described herein may be combined with one or more other portions of another of FIGS. 1-10. Accordingly, no single aspect described herein should be construed as limiting and aspects of the disclosure may be suitably combined without departing from the teachings of the disclosure.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. For example, a storage medium (e.g., a storage device) may be coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein, but is to be accorded the widest scope possible consistent with the principles and novel features as defined by the following claims.

What is claimed is:

1. A method of operating a device of a data path group network, the method comprising:
    receiving, at a first device, a second message from a second device of the data path group network, wherein the second message includes at least one of a lifetime value and a heartbeat value corresponding to the data path group network;
    generating, at the first device in response to the receiving the second message, a first message including data for indicating availability of a service of the data path group network and including at least one of the lifetime value and the heartbeat value corresponding to the data path group network, the lifetime value indicating a time period that the service is available via the data path group network and the heartbeat value indicating a duration that the first device is to remain associated with the data path group network;
    transmitting the first message from the first device of the data path group network to at least one device of the data path group network;
    joining the data path group network in response to the receiving the second message;
    setting a lifetime counter of the first device based on the lifetime value in response to the receiving the second message;
    periodically determining whether the lifetime counter is expired; and
    updating the lifetime counter in response to determining that the lifetime counter is unexpired.

2. The method of claim 1, wherein the first message includes a service discovery message and is transmitted from the first device to the at least one device during a discovery window.

3. The method of claim 2, wherein the first device is included in a neighborhood-aware network (NAN) that includes the data path group network.

4. The method of claim 1, wherein the transmitting of the first message from the first device to the at least one device comprises broadcasting the first message to a plurality of devices including a second device.

5. The method of claim 1, further comprising:
    prior to generating the first message at the first device, receiving multiple messages from a plurality of devices included in the data path group network, each of the received multiple messages including lifetime data indicating a corresponding lifetime value; and selecting, at the first device, a highest received lifetime value of the received multiple messages to be included in the first message as the lifetime value.

6. The method of claim 1, further comprising, in response to the joining of the data path group network, maintaining, at a memory of the first device, a memory allocation corresponding to the data path group network, wherein the memory allocation includes a device list identifying a plurality of devices included in the data path group network, a group key of the data path group network, a lifetime counter of the first device, a heartbeat counter of the first device, or a combination thereof.

7. The method of claim 1, further comprising, subsequent to the joining of the data path group network, switching the first device to an active mode to monitor a group communication channel of the data path group network during a group paging window of the data path group network.

8. The method of claim 1, further comprising:
monitoring, at the first device, a group communication channel of the data path group network during a group paging window of a group transmission window in response to the determining that the lifetime counter is unexpired, wherein the group transmission window includes the group paging window and a group data window;
receiving, at the first device, a traffic indication message from the second device during the group paging window;
monitoring, at the first device, the group communication channel during the group data window of the group transmission window in response to determining that the traffic indication message indicates that the second device has service data to send to the first device, wherein the service data corresponds to the service; and
receiving, at the first device, the service data from the second device during the group data window.

9. The method of claim 1, further comprising:
in response to the receiving the second message, setting a heartbeat counter of the first device based on the heartbeat value;
periodically determining whether the heartbeat counter is expired; and
in response to determining that the heartbeat counter is unexpired, updating the heartbeat counter.

10. The method of claim 9, further comprising, in response to determining that the heartbeat counter is expired, disassociating, by the first device, from the data path group network.

11. The method of claim 9, further comprising:
disassociating, by the first device, from the data path group network by transmitting a disassociation message from the first device to the second device of the data path group network; and
ceasing to maintain a memory allocation of a memory of the first device, the memory allocation corresponding to the data path group network.

12. The method of claim 1, further comprising:
determining a second lifetime value to extend a lifetime of the data path group network, wherein the first device is a provider device of the service;
transmitting the second lifetime value, wherein the second lifetime value corresponds to an end time of the data path group network; and setting the lifetime counter to correspond to the end time based on the second lifetime value.

13. The method of claim 1, further comprising:
prior to expiration of the lifetime counter, determining service data is to be communicated from the first device to a device of the data path group network;
providing the service data to the device of the data path group network prior to expiration of the lifetime counter; and
disassociating from the data path group network in response to expiration of the lifetime counter.

14. The method of claim 1, further comprising:
receiving a third message from a device of the data path group network, the third message including update data for indicating at least one of a second lifetime value or an update action.

15. The method of claim 14, wherein the update action includes changing a group key of the data path group network, changing a group communication channel of the data path group network, changing a transmission schedule of the data path group network, changing a network identifier corresponding to the data path group network, changing a neighborhood-aware network cluster corresponding to the data path group network, or a combination thereof.

16. The method of claim 14, further comprising, in response to detecting expiration of the lifetime counter that is set according to the lifetime value:
setting, based on the second lifetime value, the lifetime counter to correspond to a second end time of the data path group network.

17. A device comprising:
a memory;
a processor coupled to the memory, the processor configured to:
generate, at a first device, a first message including data for indicating availability of a service of a data path group network and including at least one of a lifetime value and a heartbeat value corresponding to the data path group network, the lifetime value indicating a time period that the service is available via the data path group network and the heartbeat value indicating a duration that the first device is to remain associated with the data path group network; and
initiate wireless transmission of the first message to at least one device of the data path group network; and
a receiver configured to receive a second message from a second device of the data path group network, wherein the second message includes at least one of the lifetime value and the heartbeat value;
wherein the processor is further configured to:
join the data path group network in response to reception of the second message, wherein the first message is generated in response to reception of the second message;
set a heartbeat counter of the first device based on the heartbeat value in response to reception of the second message;
periodically determine whether the heartbeat counter is expired; and
update the heartbeat counter in response to a determination that the heartbeat counter is unexpired.

18. The device of claim 17, further comprising:
a transmitter configured to transmit the first message to the at least one device.

19. The device of claim 17, wherein the data is included in a group attribute field of the first message.

20. The device of claim 17, wherein the data further indicates a transmission schedule corresponding to a group communication channel of the data path group network, and wherein the transmission schedule includes a discovery window offset, a first size of a group transmission window, a second size of a group paging window, a number of consecutive group transmission windows between a pair of consecutive discovery windows, an offset between a pair of consecutive group transmission windows, or a combination thereof.

21. The device of claim 17, wherein the data further indicates a hop count to a provider device of the service corresponding to the data path group network, a media access control (MAC) address of the provider device, a device identifier (ID) of the provider device, or a combination thereof.

22. A computer-readable storage device storing instructions that, when executed by a processor, cause the processor to perform operations comprising:
   generating, at a first device, a first message including data for indicating availability of a service of a data path group network and including at least one of a lifetime value and a heartbeat value corresponding to the data path group network, the lifetime value indicating a time period that the service is available via the data path group network and the heartbeat value indicating a duration that the first device is to remain associated with the data path group network;
   initiating wireless transmission of the first message from a first device of the data path group network to at least one other device of the data path group network;
   setting, based on the lifetime value, a lifetime counter of the first device to correspond to a first end time of the data path group network;
   determining a second lifetime value to extend a lifetime of the data path group network, wherein the first device is a provider device of the service;
   initiating transmission of the second lifetime value, wherein the second lifetime value corresponds to a second end time that is subsequent to the first end time; and
   setting the lifetime counter to correspond to the second end time based on the second lifetime value.

23. The computer-readable storage device of claim 22, wherein the operations further comprise:
   prior to generating the first message, joining the data path group network, wherein the data further indicates a group communication channel of the data path group network, and wherein the first message is transmitted via a second communication channel that is distinct from the group communication channel of the data path group network; and
   subsequent to joining the data path group network and in response to determining that a lifetime counter and a heartbeat counter of the first device are unexpired, monitoring the group communication channel during a group paging window corresponding to the data path group network.

24. The computer-readable storage device of claim 23, wherein the operations further comprise, subsequent to joining the data path group network, disassociating the first device from the data path group network in response to determining that at least one of the lifetime counter or the heartbeat counter of the first device is expired.

25. An apparatus comprising:
   means for generating, at a first device, a first message including data for indicating availability of a service of a data path group network and including at least one of a lifetime value and a heartbeat value corresponding to the data path group network, the lifetime value indicating a time period that the service is available via the data path group network and the heartbeat value indicating a duration that the first device is to remain associated with the data path group network;
   means for transmitting the first message from a first device of the data path group network to at least one other device of the data path group network;
   means for receiving a second message from a third device, the second message including at least one of the lifetime value and the heartbeat value, the first message generated in response to the second message; and
   means for storing the lifetime value and the heartbeat value.

26. The apparatus of claim 25, wherein the data path group network comprises an infrastructure-less, peer-to-peer network.

27. The apparatus of claim 25, wherein the data path group network includes multiple devices of a neighborhood-aware network (NAN).

* * * * *